United States Patent
Chiba et al.

(10) Patent No.: US 7,664,291 B2
(45) Date of Patent: Feb. 16, 2010

(54) ENCODING DEVICE, DECODING DEVICE, AND PRINTED MATTER

(75) Inventors: Hirotaka Chiba, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 633 days.

(21) Appl. No.: 11/350,718

(22) Filed: Feb. 10, 2006

(65) Prior Publication Data
US 2007/0092105 A1    Apr. 26, 2007

(30) Foreign Application Priority Data
Oct. 26, 2005    (JP)    ............... 2005-311223

(51) Int. Cl.
*G06K 9/00* (2006.01)
*H04N 1/40* (2006.01)
*H04N 1/46* (2006.01)

(52) U.S. Cl. ............ 382/100; 358/3.28; 358/539

(58) Field of Classification Search ........... 382/100, 382/232, 234, 236–239, 242, 246, 248; 358/426.03, 358/426.04, 426.07, 426.12, 3.28, 539; 712/208–213; 714/755, 759, 760, 791, 793, 795; 375/262, 375/341
See application file for complete search history.

(56) References Cited

U.S. PATENT DOCUMENTS

| | | | |
|---|---|---|---|
| 6,175,639 B1 * | 1/2001 | Satoh et al. | 382/100 |
| 6,215,421 B1 * | 4/2001 | Kondo et al. | 341/50 |
| 6,700,989 B1 * | 3/2004 | Itoh et al. | 382/100 |
| 2003/0187798 A1 | 10/2003 | McKinley et al. | |
| 2004/0234139 A1 | 11/2004 | Moroo et al. | |
| 2005/0069171 A1 | 3/2005 | Rhoads et al. | |
| 2005/0180596 A1 * | 8/2005 | Abe et al. | 382/100 |

FOREIGN PATENT DOCUMENTS

| | | |
|---|---|---|
| EP | 1 480 163 | 11/2004 |
| JP | 2002-260099 | 9/2002 |
| JP | 2004-349879 | 12/2004 |
| JP | 2005-117154 | 4/2005 |

OTHER PUBLICATIONS

Christoph Dautzenberg, "Watermarking images", Department of Microelectronics and Electrical Engineering, Trinity College Dublin, Oct. 1994.

* cited by examiner

*Primary Examiner*—Abolfazl Tabatabai

(57) ABSTRACT

In an encoding device that creates an image in which data is embedded, an embedding unit divides an image into a plurality of blocks, and embeds data in the image based on a difference in value of characteristics of adjacent blocks; and a restriction information recording unit records use restriction information that restricts use of embedded data.

14 Claims, 34 Drawing Sheets

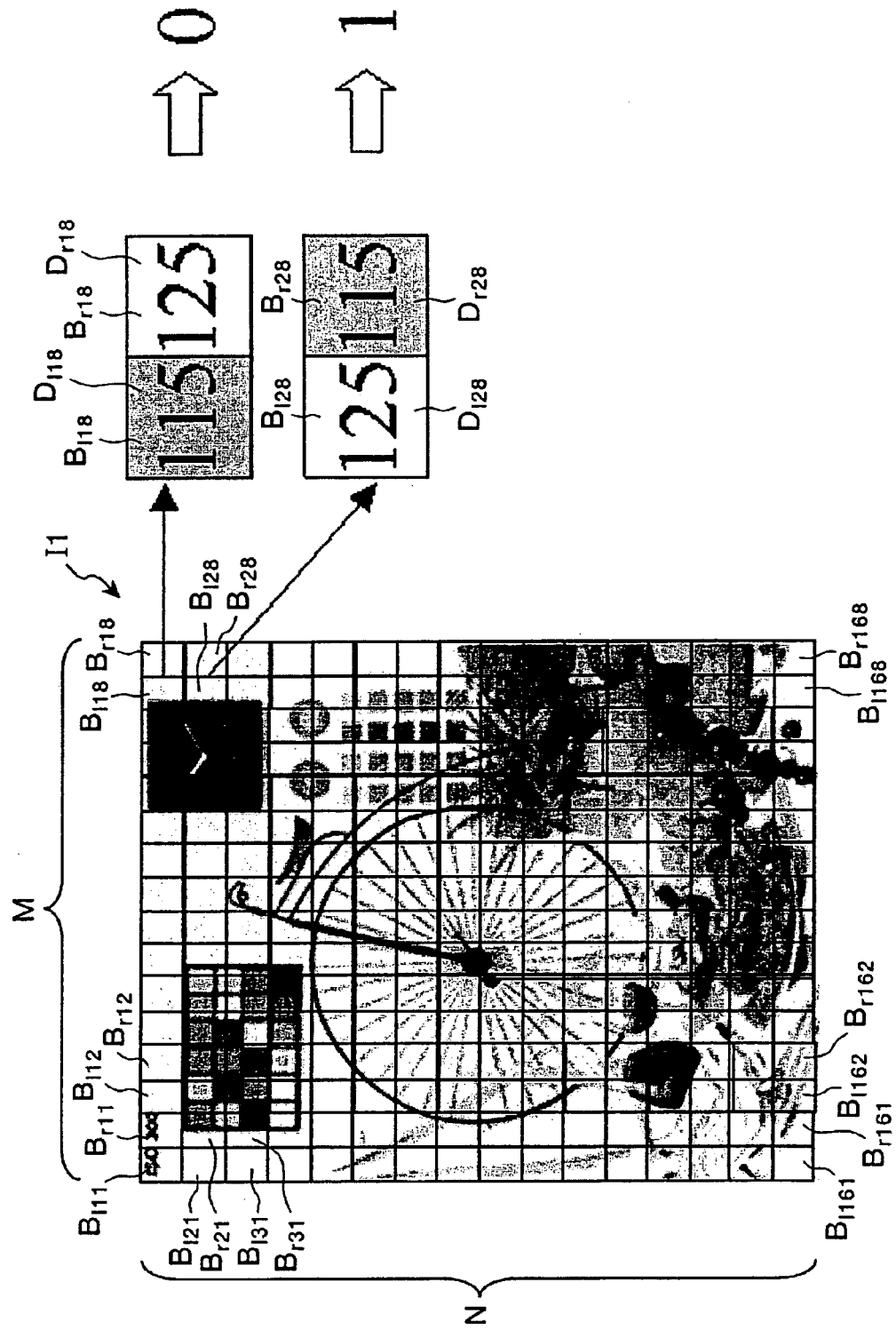

FIG.5

(A) WHEN $D_l < D_r$ $$D'_l = (D_l + D_r)/2 - T/2 \quad \cdots \quad (1)$$
$$D'_r = (D_l + D_r)/2 + T/2 \quad \cdots \quad (2)$$

(B) WHEN $D_l \geqq D_r$ $$D'_l = (D_l + D_r)/2 + T/2 \quad \cdots \quad (3)$$
$$D'_r = (D_l + D_r)/2 - T/2 \quad \cdots \quad (4)$$

$D'_l$ : LEFT-SIDE AVERAGE DENSITY DATA AFTER ALTERING
$D'_r$ : RIGHT-SIDE AVERAGE DENSITY DATA AFTER ALTERING
$D'_l$ : LEFT-SIDE AVERAGE DENSITY DATA BEFORE ALTERING
$D'_r$ : RIGHT-SIDE AVERAGE DENSITY DATA BEFORE ALTERING
T : DIFFERENCE FOR EACH T BLOCK

FIG.6

CODE USE INFORMATION
130a

| CODE | USABILITY |
|------|-----------|
| 0001 | PERMITTED |
| 0002 | PERMITTED |
| ⋮ | ⋮ |

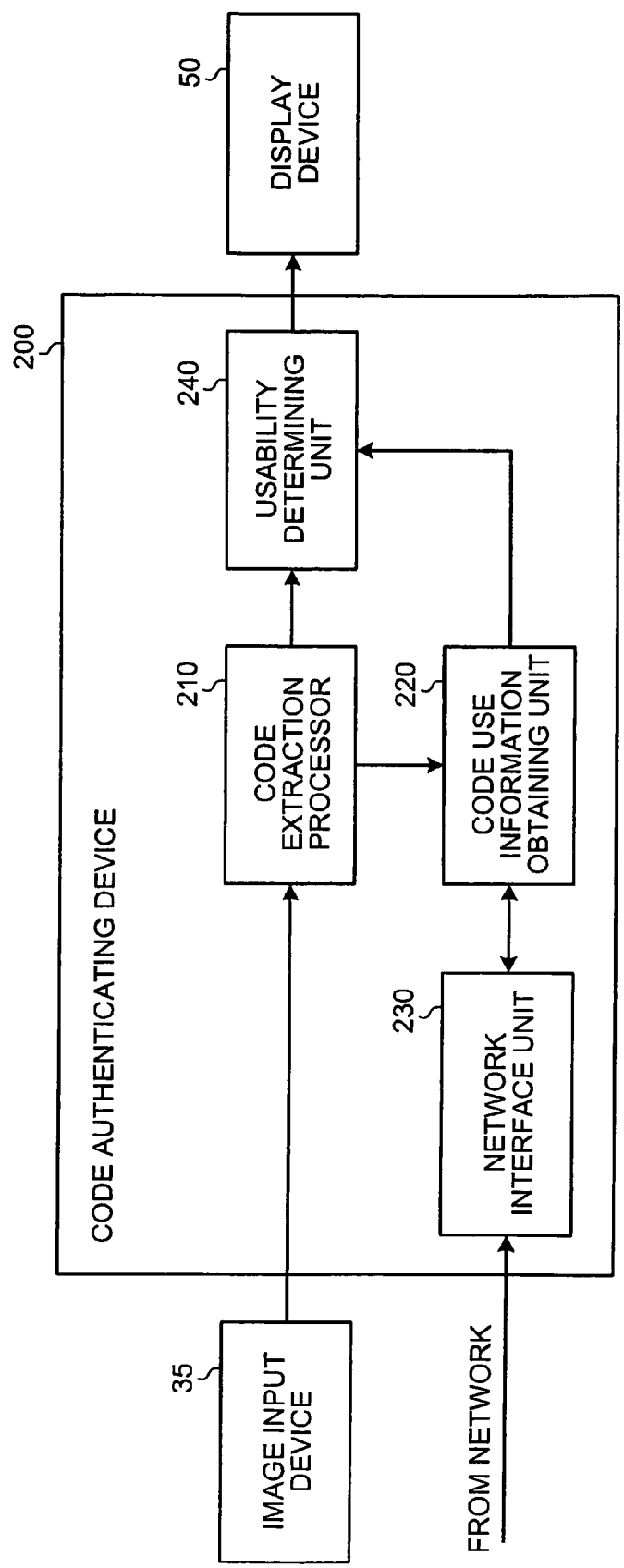

FIG.11

| CODE | CODE USE INFORMATION USABILITY |
|------|-----------|
| 0001 | NOT PERMITTED |
| 0002 | PERMITTED |
| ⋮ | ⋮ |

FIG.13

CODE USE INFORMATION
420a

| CODE | USE TIME-LIMIT |
|---|---|
| 0001 | 2005.9.1 |
| 0002 | 2005.9.30 |
| ⋮ | ⋮ |

FIG.18

CODE USE INFORMATION

| CODE | NUMBER OF VALID USES |
|---|---|
| 0001 | 10 |
| 0002 | 9 |
| ⋮ | ⋮ |

- PRINTED MATTER
- ENCODED IMAGE
- TWO-DIMENSIONAL CODE

CODE USE INFORMATION
950a

| CODE | USABILITY |
|---|---|
| 00002222 | PERMITTED |
| 11112222 | PERMITTED |
| ⋮ | ⋮ |

FIG.32

CODE USE INFORMATION
1120a

| CODE | USER ID | USABILITY |
|------|---------|-----------|
| 0000 | 000 | NOT PERMITTED |
| 0000 | 001 | PERMITTED |
| 0000 | 002 | NOT PERMITTED |
| 1111 | 000 | NOT PERMITTED |
| 1111 | 001 | PERMITTED |
| 1111 | 002 | NOT PERMITTED |
| ⋮ | ⋮ | ⋮ |

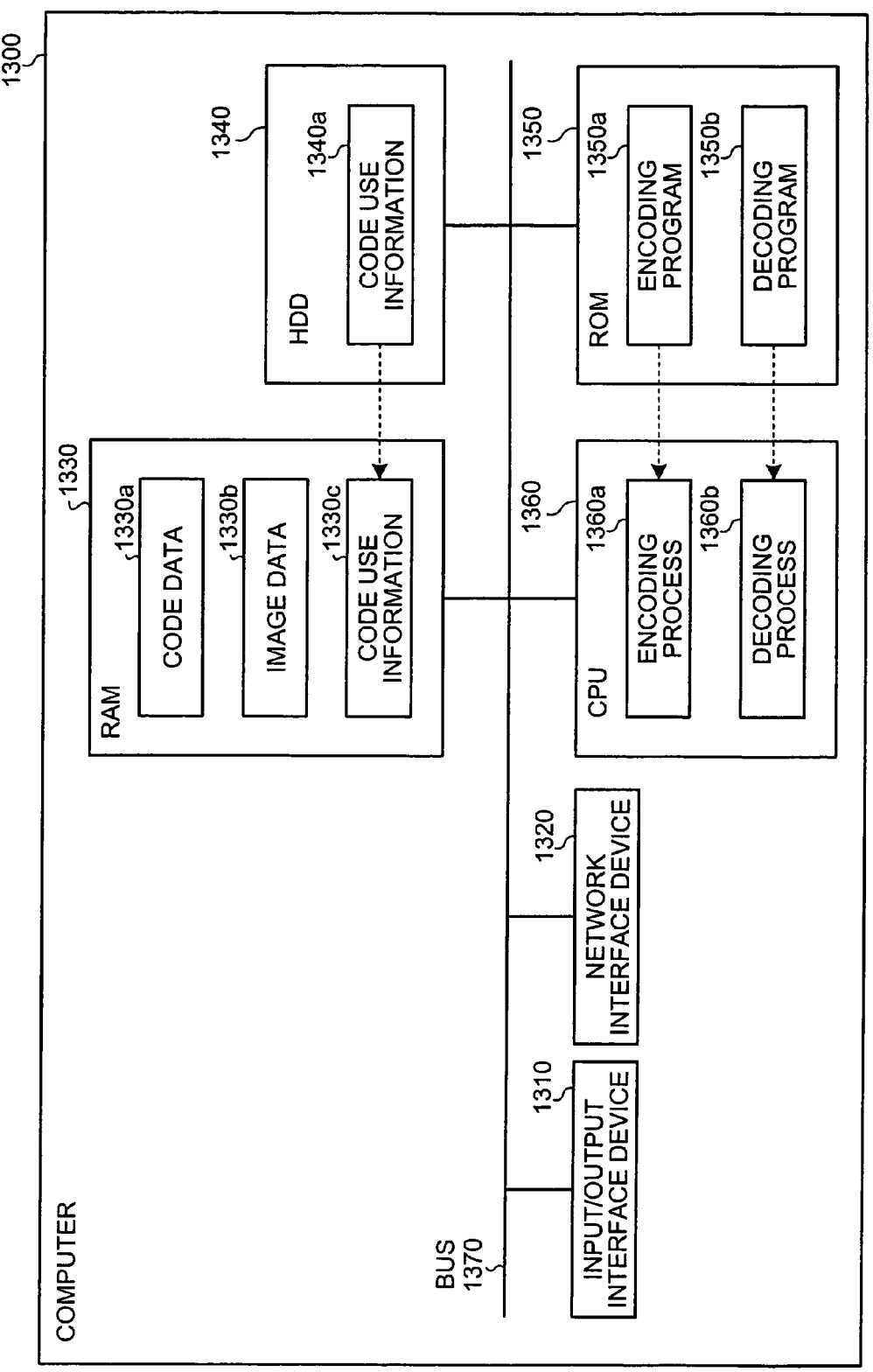

ENCODING DEVICE, DECODING DEVICE, AND PRINTED MATTER

BACKGROUND OF THE INVENTION

1. Field of the Invention

The present invention relates to an encoding device, a decoding device, and printed matter, which can prevent illegitimate falsification/use of coded information.

2. Description of the Related Art

Conventionally, proprietors of supermarkets, convenience stores, and the like, issue coupons as cash vouchers to customers to increase the sale of products. These coupons are collected at the time of payment, when POS (point of sales) terminals and the like obtain information indicating discounted products from the coupons, and deduct predetermined amounts from these products that are targets of the coupons.

However, issuing coupons to customers is a considerably tiresome operation. Japanese Patent Application Laid-open No. 2002-260099 discloses a system that two-dimensionally codes the information indicating the discounted products, transmits this two-dimensionally coded information to mobile telephones and the like belonging to customers, and, at the time of payment, the customers display the two-dimensionally coded information on the screens of their mobile telephones and the like, allowing the POS terminals and the like to read it and deduct predetermined amounts from the discounted products.

However, the two-dimensional code used in Japanese Patent Application Laid-open No. 2002-260099 has a problem in that it is standardized, and can be easily created by a third party. That is, there is a risk that a malicious third party can illegitimately create a two-dimensional code for discounting, and use this to obtain illegitimate discounts on non-discounted products.

The proprietor who issues the two-dimensional code does not assume in many cases that it can be used a plurality of times. However, the two-dimensional code used in Japanese Patent Application Laid-open No. 2002-260099 has no restrictions on its use and can be used unrestrictedly inside the store, leading to a problem that when the same customer uses the same two-dimensional code many times, though sales increase, the intended profit cannot be achieved.

SUMMARY OF THE INVENTION

It is an object of the present invention to at least solve the problems in the conventional technology.

According to one aspect of the present invention, an encoding device that creates an image in which data is embedded, includes an embedding unit that divides an image into a plurality of blocks, and embeds data in the image based on a difference in value of characteristics of adjacent blocks; and a restriction information recording unit that records use restriction information that restricts use of embedded data.

According to still another aspect of the present invention, a decoding device that extracts data embedded in an image, includes a data extracting unit that divides an image into a plurality of blocks, and extracts the data embedded in the image based on a difference in value of characteristics of adjacent blocks; an acquiring unit that acquires use restriction information that restricts use of extracted data; and a determining unit that determines, based on the use restriction information acquired, whether use of the extracted data is permitted.

According to another aspect of the present invention, a printed matter including an image that is printed after being created by an encoding device, where the encoding device includes an embedding unit that divides an image into a plurality of blocks, and embeds data in the image based on a difference in value of characteristics of adjacent blocks; and a restriction information recording unit that records use restriction information that restricts use of embedded data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an example of block-divided image data;

FIG. 5 is an explanatory diagram of a density alteration process performed by a code forming unit;

FIG. 6 is an example of a data structure of code use information;

FIG. 7 is a functional block diagram of a code authenticating device according to the first embodiment;

FIG. 11 is an example of the code use information shown in FIG. 6 after being updated;

FIG. 13 is an example of a data structure of code use information according to the second embodiment;

FIG. 18 is an example of a data structure of code use information according to the third embodiment;

FIG. 32 is an example of a data structure of code use information according to the sixth embodiment;

FIG. 36 is a functional block diagram of a computer that realizes functions of a code embedding device and a code authenticating device.

DETAILED DESCRIPTION OF THE PREFERRED EMBODIMENTS

Exemplary embodiments of the present invention will be explained below with reference to the accompanying drawings.

An encoding device and an decoding device according to the present invention will be explained first. When embedding a code in an image, the encoding device according to the present invention divides the image into a plurality of blocks and embeds the code based on a difference in characteristic quantities of adjacent blocks. In addition, it stores code use information that restricts the use of the embedded code. The encoding device also prints the image in which the code is embedded.

The decoding device extracts the code that is embedded in the printed matter printed by the encoding device, obtains the code use information that corresponds to the extracted code from the encoding device, determines whether the extracted code can be used, and outputs a determination result.

Since the code embedding method used by the encoding device is based on the difference in characteristic quantity of adjacent blocks and not standardized in the manner of a two-dimensional code, a third party cannot easily falsify the code embedded in the image. Therefore, using the encoding device of the present invention instead of the two-dimensional code used in Japanese Patent Application Laid-open No. 2002-260099 to embed information indicating discounted products in the image, solves the problem of non-discounted products being illegitimately discounted.

Since the decoding device extracts the code embedded in the image, obtains the code use information that corresponds to the extracted code, and determines whether the extracted code can be used, restrictions can be placed on the use of the code embedded in the image, thereby preventing unrestricted use of the code as in Japanese Patent Application Laid-open No. 2002-260099.

Figure 1:
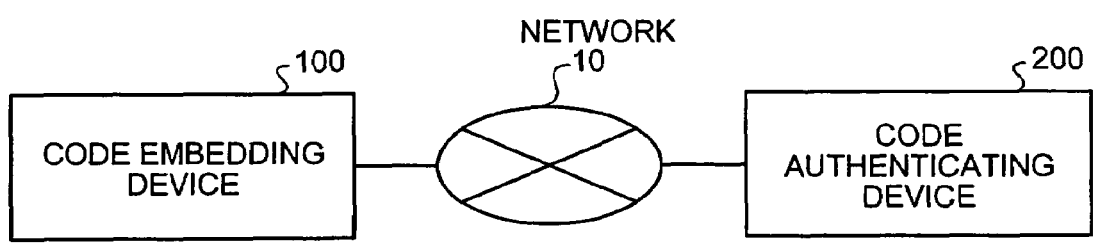
FIG. 1 is an example of an encoding/decoding system according to a first embodiment.

A code embedding device and a code authenticating device according to the present invention will be explained next. A first embodiment describes a code embedding device as an example of an encoding device, and describes a code authenticating device as an example of a decoding device. FIG. 1 is an example of an encoding/decoding system according to the first embodiment. As shown in FIG. 1, a code embedding device 100 is connected to a code authenticating device 200 via a network 10.

Figure 2:
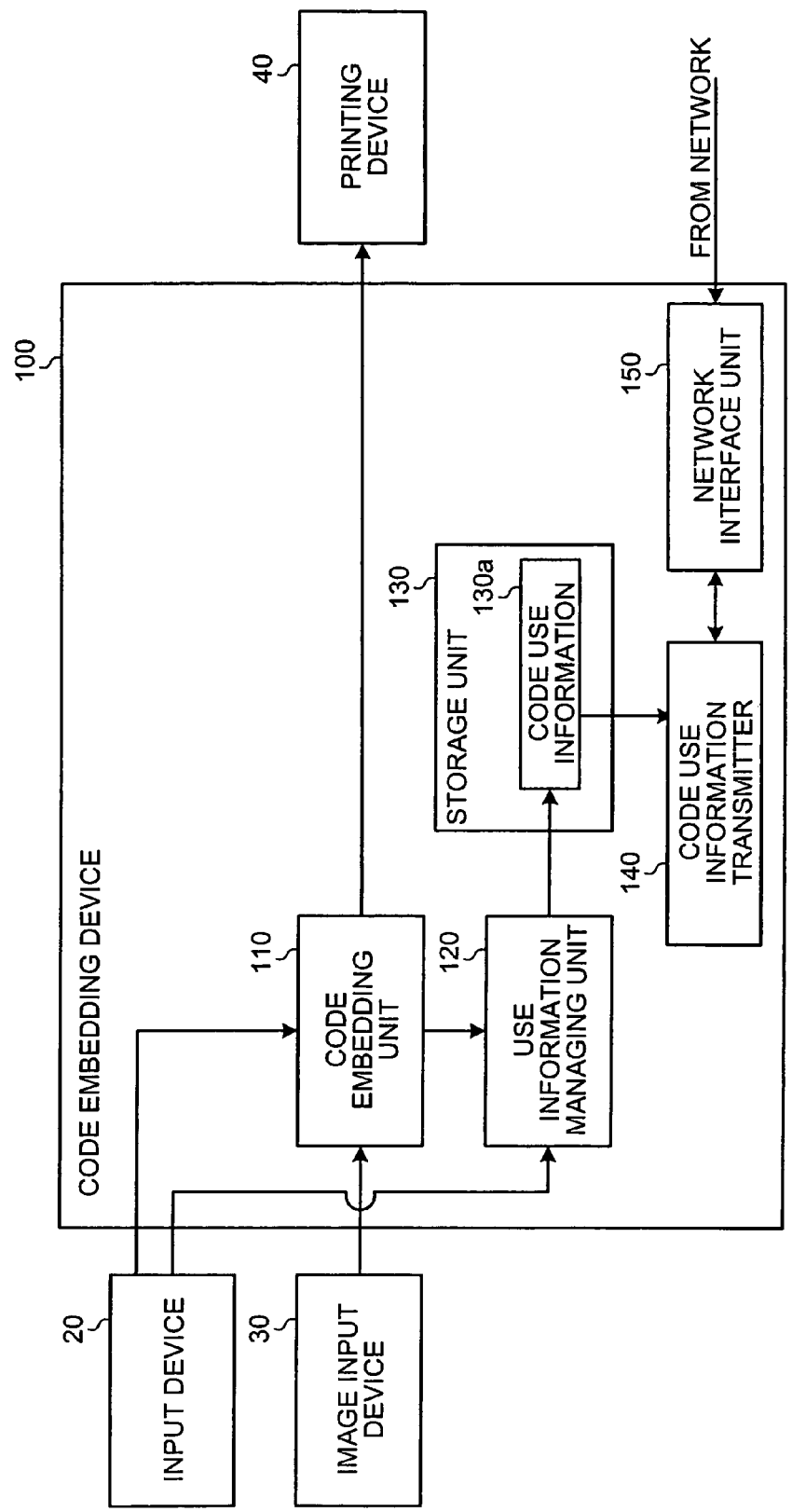
FIG. 2 is a functional block diagram of a code embedding device according to the first embodiment.

The code embedding device 100 divides an image into a plurality of blocks and embeds a code based on the difference in characteristic quantities of adjacent blocks. In addition, it stores code use information that restricts the use of the embedded code. FIG. 2 is a functional block diagram of the configuration of the code embedding device 100 according to the first embodiment. As shown in FIG. 2, the code embedding device 100 includes a code embedding unit 110, a use information managing unit 120, a storage unit 130, a code use information transmitter 140, and a network interface unit 150. The code embedding device 100 is connected to an input device 20, an image input device 30, and a printing device 40.

The input device 20 includes a keyboard or the like. A manager of the code embedding device 100 uses the input device 20 to input a code for embedding in the image, and code use information indicating the code embedded in the image, to the code embedding device 100.

The image input device 30 obtains image data by scanning an image that is drawn (printed) on paper, film, or the like, and inputs the obtained image data to the code embedding device 100. While this example describes the image input device 30, the configuration is not limited to this, it being acceptable for the manager to input data of an image taken by a digital camera and the like to the code embedding device 100. The printing device 40 obtains encoded image data from the code embedding device 100 and prints the image.

Returning to the explanation of the code embedding device 100, the code embedding unit 110 is a processor that obtains the code from the input device 20, obtains the image data from the image input device 30, and embeds the code in the image data. The image data is created in a predetermined format (for example, JPEG (Joint Photographic Expert Group) or (GIF) Graphic Interchange Format) and has a size of 1024×1024 pixels.

Figure 3:
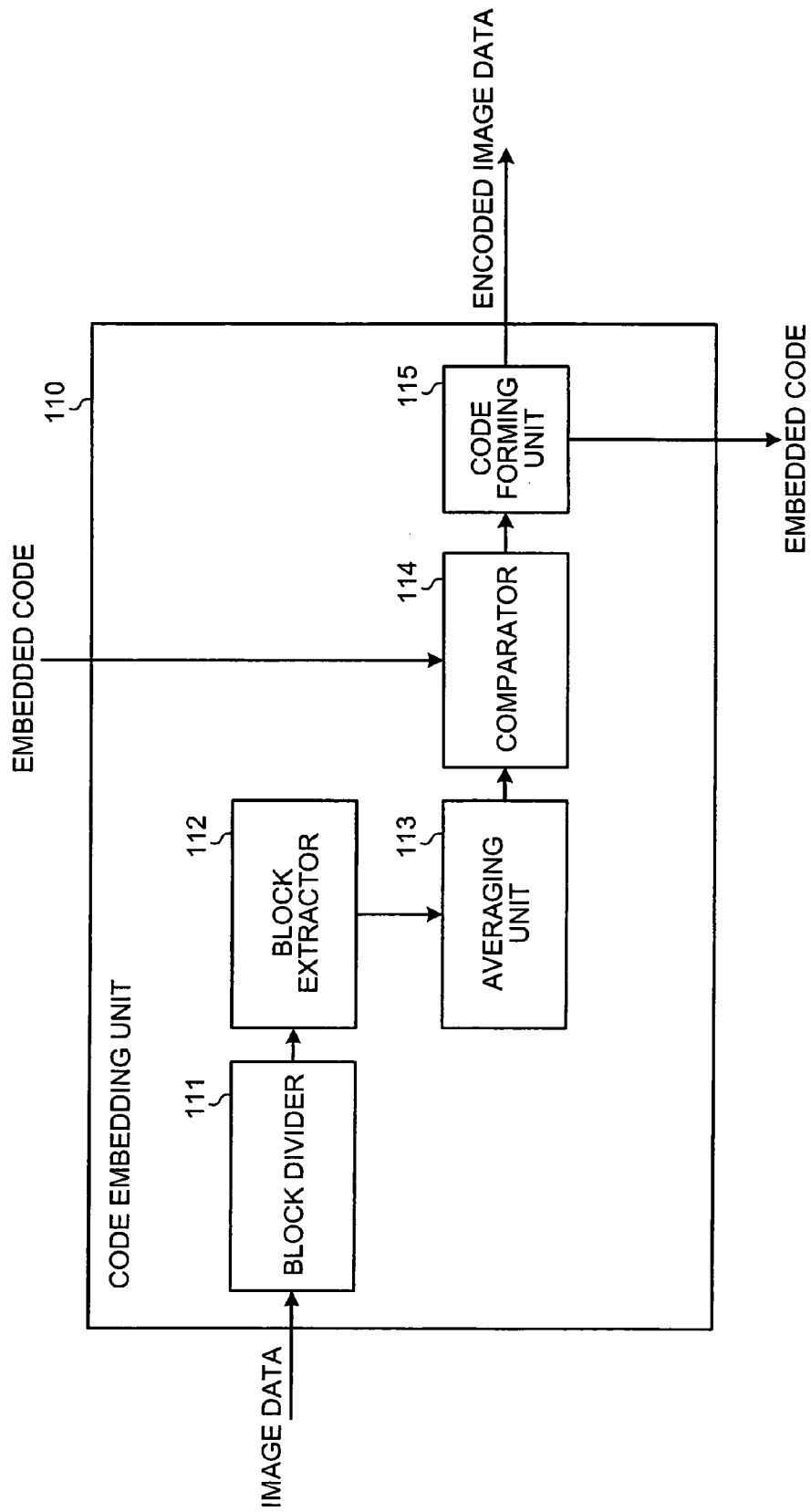
FIG. 3 is a functional block diagram of a code embedding unit.

The configuration of the code embedding unit 110 will be explained next. FIG. 3 is a functional block diagram of the configuration of the code embedding unit 110. As shown in FIG. 3, the code embedding unit 110 includes a block divider 111, a block extractor 112, an averaging unit 113, a comparator 114, and a code forming unit 115.

The block divider 111 is a processor that divides the image data into blocks of N rows×M columns (16 rows×16 columns in this example), and outputs this as block division image data I1. FIG. 4 is an example of the block-divided image data I1.

As shown in FIG. 4, the block-divided image data I1 includes 256 (16×16) blocks including block $B_{l11}$, $B_{r11}$, ..., $B_{l18}$, $B_{r18}$, $B_{l21}$, $B_{r21}$, ..., $B_{l168}$, and $B_{r168}$. The size of one block is 64×64 pixels. A one-bit code is embedded in pair blocks (two adjacent blocks) of the block-divided image data I1.

Specifically, the pair blocks including blocks $B_{l11}$ and $B_{r11}$, blocks $B_{l12}$ and $B_{r12}$, ..., $B_{l18}$ and $B_{r18}$ (the first row), blocks $B_{l21}$, and $B_{r21}$, ..., blocks $B_{l28}$ and $B_{r28}$ (the second row), ..., blocks $B_{l116}$, and $Br_{l61}$, ..., blocks $B_{l168}$ and $B_{r168}$ (sixteenth row).

In one of the pair blocks, block $B_{lxy}$, the subscript l expresses that this block is on the left-side side of the pair. The subscript x expresses a row (N). The subscript y expresses a column (M). In the other block of the pair, block $B_{rxy}$, the subscript r expresses that this block is on the right-side side of the pair. The subscript x expresses a row (N). The subscript y expresses a column (M).

In each pair block, an average density level (average gradation of each pixel in the block: 0 to 255) as a characteristic quantity of the left-side block $B_{lxy}$ is deemed left-side average density data $D_l$, and an average density level (characteristic quantity) of the right-side block $B_{rxy}$ is deemed right-side average density data $D_r$.

As indicated by the equations below, when the left-side average density data $D_l$ is less than the right-side average density data $D_r$, the pair block expresses a one-bit code of "0". When the left-side average density data $D_l$ is equal to or greater than the right-side average density data $D_r$, the pair block expresses a one-bit code of "1".

$$D_l < D_r \rightarrow \text{"0"}$$

$$D_l \geq D_r \rightarrow \text{"1"}$$

For example, in the pair block including the blocks $B_{l18}$ and $B_{r18}$ in FIG. 4, since the left-side average density data $B_{l18}$ is "115" and the right-side average density data $B_{r18}$ is "125", this pair block expresses a one-bit code of "0".

In the pair block including the blocks $B_{l28}$ and $B_{r28}$, since the left-side average density data $B_{l28}$ is "125" and the right-side average density data $B_{r28}$ is "115", this pair block expresses a one-bit code of "1".

In the block-divided image data I1, since there are eight pair blocks (16 blocks) in each row, a code of eight bits is expressed. Therefore, the rows in total (16 rows) express a code of 128 bits. In the first embodiment, since a code C of 16 bits is embedded in the block-divided image data I1, the code C can be embedded a maximum of eight (128/16) times in the block-divided image data I1.

Referring back to FIG. 3, the block extractor 112 is a processor that sequentially extracts a pair block (block $B_{lxy}$ and block $B_{rxy}$) from the block-divided image data I1 by bit-shifting of the code C, and sequentially outputs the density distribution in each of the blocks $B_{lxy}$ and $B_{rxy}$ as block density data D.

Bit-shifting of the code C includes shifting a bit-pointer to the right-side one bit at a time from the leftmost bit (1) toward the right-side bit (0).

The averaging unit 113 is a processor that determines left-side average density data $D_l$ corresponding to the block $B_{lxy}$ and right-side average density data $D_r$ corresponding to the block $B_{rxy}$ from the block density data D.

The comparator 114 compares the n-th bit of the code C (bits from the leftmost side being numbered as n=1, 2, ..., 16) with a bit determination result that is determined from the magnitude relationship between the left-side average density data $D_l$ and the right-side average density data $D_r$ (a bit determined as "0" or "1" from the above equations).

The code forming unit 115 is a processor that embeds the code C in the block-divided image data I1 based on the comparison result of the comparator 114. Specifically, when the comparison result of the comparator 114 is a match, the code forming unit 115 maintains the magnitude relationship between the left-side average density data $D_l$ and the right-side average density data $D_r$. On the other hand, when the comparison result is a mismatch, the code forming unit 115 performs a density alteration process by altering the left-side average density data $D_l$ and the right-side average density data $D_r$ (reversing their magnitude relationship) such that their magnitude relationship expresses a bit of code C, creates image data that is encoded by this code (hereinafter, "encoded image data"), and outputs it. The code forming unit 115 sends information indicating the code that is embedded in the image to the use information managing unit 120 shown in FIG. 2.

FIG. 5 is an explanatory diagram of a density alteration process performed by the code forming unit 115. As shown in FIG. 5, when $D_l < D_r$, the density alteration process determines left-side average density data $D'_l$ after alteration using the equation (1), and determines right-side average density data $D'_r$ after alteration using the equation (2). T is the level difference between pair blocks, and has a value of, for example, "30". After density alteration, the left-side average density data $D'_l$ is less than the right-side average density data $D'_r$, and the bit determination result changes from "1" to "0".

On the other hand, when $D_l \geq D_r$, the density alteration process determines left-side average density data $D'_l$ after alteration using the equation (3), and determines right-side average density data $D'_r$ after alteration using the equation (4). Consequently, after density alteration, the left-side average density data $D'_l$ is greater than the right-side average density data $D'_r$, and the bit determination result is changed from "0" to "1".

While in the above explanation, average density is used as a characteristic quantity for embedding the code in the image data, the code can be embedded in the image data by using quantities of other characteristics relating to the image such as granularity, saturation, density mass, dispersion, or the like.

While in the above explanation, bits are expressed by using the difference in characteristic quantities between pair blocks, bits can be expressed by using the difference in characteristic quantities in other combinations of blocks.

By dividing the image data into blocks and expressing bits by using the differences in characteristic quantities in combinations of blocks in this way, a code can be embedded in the image data. Since the encoding/decoding of this method requires no complex computational process such as a fast Fourier transform, it can be implemented with a low-speed information processing device.

However, since the characteristic quantities in combinations of blocks are affected by the characteristics of the output medium and the input unit, there are cases when the embedded code cannot be read correctly. For example, when the image data that the code is embedded in is printed on paper, it becomes impossible to distinguish differences in the densities of blocks whose density exceeds a fixed level.

In the above example, to avoid such effects of the output unit and maintain the reading precision of the embedded code, the same code is embedded eight times in one image data. The reading precision can be improved by increasing the size of each block and embedding the same code a plurality of times.

Returning to the explanation of FIG. 2, the use information managing unit 120 is a processor that obtains the code embedded in the image data from the code embedding unit 110, obtains information indicating the usability of the code from the input device 20, and creates code use information based on the obtained information. The use information managing unit 120 stores the created code use information in the storage unit 130.

The storage unit 130 stores code use information 130a. FIG. 6 is one example of the data structure of the code use information 130a. As shown in FIG. 6, the code use information 130a includes "code" and "usability". In FIG. 6, use of codes "0001" and "0002" is permitted.

The code use information transmitter 140 is a processor that, when an inquiry relating to the usability of a code is received from the code authenticating device 200 shown in FIG. 1, retrieves the information indicating the usability of the corresponding code from the code use information 130a, and transmits the retrieved information to the code authenticating device 200. For example, when the code use information transmitter 140 receives an inquiry relating to the usability of the code "0001", it transmits information indicating that the code "0001" can be used to the code authenticating device 200 (because, in FIG. 6, the usability for the code "0001" is "Permitted").

The network interface unit 150 is a processor that uses a predetermined communication protocol to communicate with the code authenticating device 200.

The configuration of the code authenticating device 200 shown in FIG. 1 will be explained next. FIG. 7 is a functional block diagram of the configuration of the code authenticating device 200 according to the first embodiment. As shown in FIG. 7, the code authenticating device 200 includes a code extraction processor 210, a code use information obtaining unit 220, a network interface unit 230, and a usability determining unit 240. The code authenticating device 200 is connected to an image input device 35 and a display device 50.

The image input device 35 reads the image from the printed matter created by the code embedding device 100 shown in FIG. 2, and inputs data of the read image to the code authenticating device 200. The display device 50 displays data that is output from the code authenticating device 200.

Returning to the explanation of the code authenticating device 200, the code extraction processor 210 obtains the image data from the image input device 35 and extracts the code from the obtained image data. Specifically, the code extraction processor 210 divides the image data into a plurality of blocks, and extracts the code based on the difference in the average densities of adjacent blocks. The code extraction processor 210 sends the extracted code to the code use information obtaining unit 220 and the usability determining unit 240.

Though the code extraction processor 210 extracts the code from image data by using average density as the characteristic quantity, it can also extract the code from the image data by using other characteristic quantities relating to an image, such as granularity, saturation, density mass, dispersion, or the like.

The code use information obtaining unit 220 is a processor that, when a code is obtained from the code extraction processor 210, requests information indicating the usability of the code from the code embedding device 100 shown in FIG. 1. Specifically, when the code use information obtaining unit 220 obtains a code of "0001" from the code extraction processor 210, it requests information indicating the usability of the code "0001" to the code embedding device 100.

When the code use information obtaining unit 220 receives a reply (for example, "Code 0001 is usable") from the code embedding device 100, it sends the received information to the usability determining unit 240.

The usability determining unit 240 is a processor that determines whether a code extracted by the code extraction processor 210 can be used. Specifically, the usability determining unit 240 obtains a code from the code extraction processor 210, and obtains information indicating the usability of the code from the code use information obtaining unit 220. When the code can be used, the usability determining unit 240 outputs information indicating that the code can be used to the display device 50. When the code cannot be used, the usability determining unit 240 outputs information indicating that the code cannot be used to the display device 50.

For example, when the usability determining unit 240 obtains the code "0001" from the code extraction processor 210 and obtains information indicating that "Code 0001 is Usable", it determines that the code "0001" can be used.

On the other hand, when the usability determining unit 240 obtains the code "0001" from the code extraction processor 210 and obtains information indicating that "Code 0001 is Unusable", it determines that the code "0001" cannot be used.

The network interface unit 230 is a processor that uses a predetermined communication protocol to communicate with the code embedding device 100 shown in FIG. 1.

Figure 8:
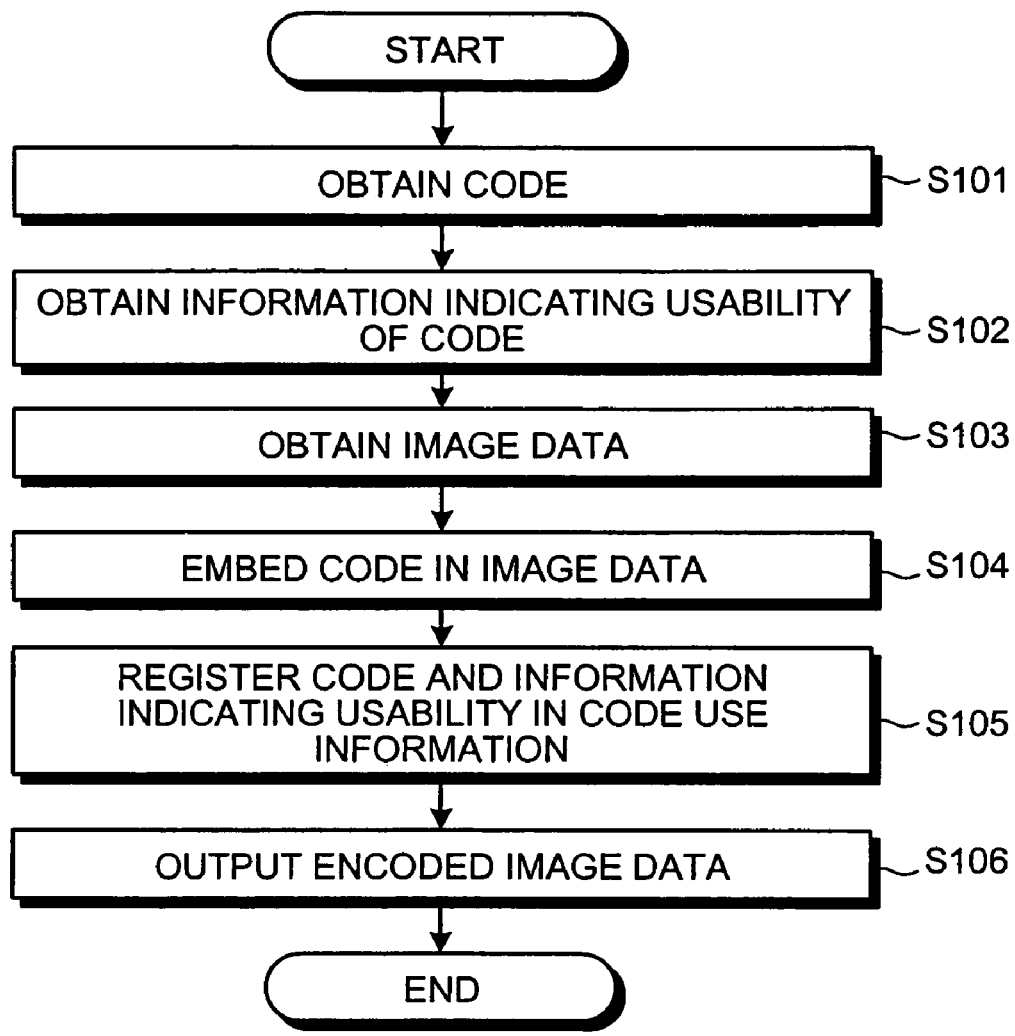
FIG. 8 is a flowchart of a process performed by the code embedding device according to the first embodiment.

A process performed by the code embedding device 100 according to the first embodiment will be explained next. FIG. 8 is a flowchart of a process performed by the code embedding device 100 according to the first embodiment. As shown in FIG. 8, the code embedding unit 110 of the code embedding device 100 obtains the code from the input device 20 (step S101), and the use information managing unit 120 obtains information indicating the usability of the code from the input device 20 (step S102).

The code embedding unit 110 then obtains image data from the image input device 30 (step S103) and embeds the code in the image data (step S104). The use information managing unit 120 obtains the code embedded in the image from the code embedding unit 110 and registers the information indicating the usability of the code in the code use information 130a (step S105). The code embedding unit 110 outputs encoded image data to the printing device 40 (step S106).

Since the use information managing unit 120 of the code embedding device 100 creates the code use information that restricts the code embedded in the image data, and registers the created code use information in the storage unit 130, the code embedded in the image can be prevented from being used unrestrictedly.

Figure 9:
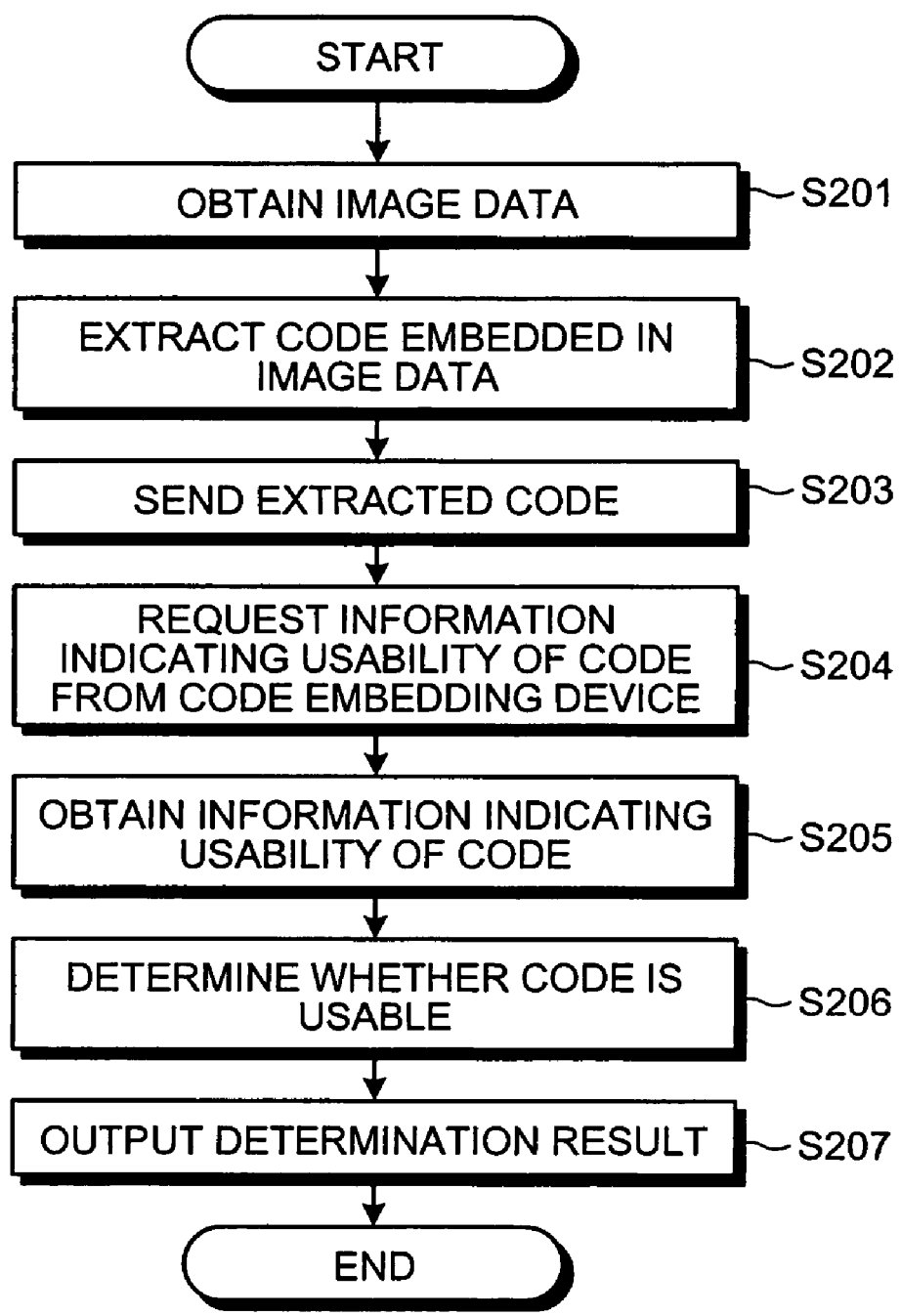
FIG. 9 is a flowchart of a process performed by the code authenticating device according to the first embodiment.

A process performed by the code authenticating device 200 according to the first embodiment will be explained next. FIG. 9 is a flowchart of a process performed by the code authenticating device 200 according to the first embodiment. As shown in FIG. 9, the code extraction processor 210 of the code authenticating device 200 obtains image data from the image input device 35 (step S201) and extracts the code embedded in the image data (step S202).

The code extraction processor 210 then sends the extracted code to the code use information obtaining unit 220 and the usability determining unit 240 (step S203). The code use information obtaining unit 220 requests information indicating the usability of the code from the code authenticating device 200 (step S204), obtains the information indicating the usability of the code from the code authenticating device 200, and sends the obtained information to the usability determining unit 240 (step S205).

The usability determining unit 240 determines whether the code obtained from the code extraction processor 210 can be used based on the information indicating the usability of the code obtained from the usability determining unit 240 (step S206), and outputs the determination result to the display device 50 (step S207). When the usability determining unit 240 determines that the code extracted by the code extraction processor 210 cannot be used, it displays "This code cannot be used" on the display device 50. On the other hand, when the usability determining unit 240 determines that the code extracted by the code extraction processor 210 can be used, it displays "This code can be used" on the display device 50.

In this way, the code extraction processor 210 of the code authenticating device 200 extracts the code from the image data, the code use information obtaining unit 220 obtains the information indicating the usability of the code from the code embedding device 100, and the usability determining unit 240 determines whether the code can be used, thereby enabling the use of the code embedded in the printed matter to be restricted.

As described above, in the code embedding device 100 according to the first embodiment, the code embedding unit 110 obtains the code and the image data, embeds the code by using difference in the average density of the image data, and creates encoded image data. The use information managing unit 120 registers information indicating the usability of the code embedded by the code embedding unit 110 in the code use information 130a. The code use information transmitter 140 retrieves the information indicating the usability from the code use information 130a in response to a request from the code authenticating device 200, and transmits it to the code authenticating device 200. Therefore, it is possible to efficiently restrict use of the code that is embedded in the printed matter created by the code embedding device 100. Furthermore, since the method of embedding the code in the image by using the difference in average density is not standardized in the manner of a two-dimensional code, falsification of the code embedded in the image can be prevented.

The code extraction processor 210 of the code authenticating device 200 uses the difference in average density of the image data to extract the code from the image data created by the code embedding device 100, and the code use information obtaining unit 220 obtains information indicating the usability of the code by requesting this information from the code embedding device. Based on the code and the information indicating the usability of the code, the usability determining unit 240 determines whether the code can be used, and outputs the determination result to the display device 50. Therefore, the problem of the code embedded in the image being used unrestrictedly can be solved.

Figure 10:
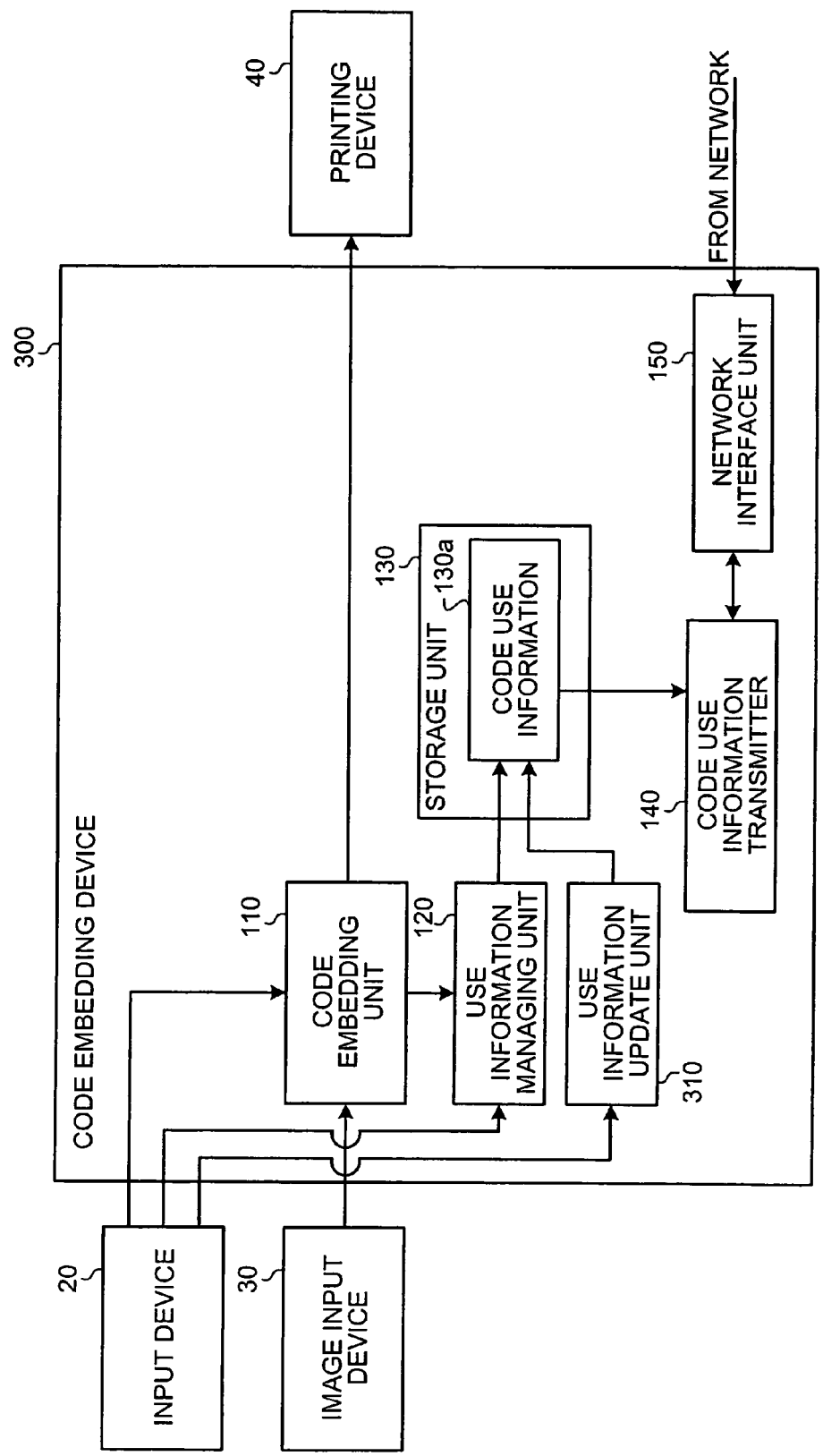
FIG. 10 is a functional block diagram of the code embedding device that enables the code use information to be updated.

In the code embedding device 100 according to the first embodiment, the code use information 130a created by the use information managing unit 120 can be updated. FIG. 10 is a functional block diagram of the configuration of a code embedding device that enables the code use information 130a to be updated. As shown in FIG. 10, a code embedding device 300 includes a use information update unit 310. Since other configurations and elements are the same as the code embedding device 100 shown in FIG. 2, they are designated with like reference numerals and are not explained again.

The use information update unit 310 is a processor that, when it obtains the code to be updated and new information indicating usability that corresponds to this code from the input device 20, updates the code use information. For example, when the use information update unit 310 receives the code "0001" and information indicating "Unusable" from the input device 20, it updates the code use information 130a in FIG. 6 to a code use information 130a in FIG. 11. FIG. 11 is an example of the code use information in FIG. 6 after being updated. A manager of the code embedding device 300 inputs the code to be updated and the new information indicating the usability to the input device 20.

Since the manager or the like of the code embedding device 300 can update the code use information 130a, the information indicating the usability of the code that is embedded in the image data can be updated efficiently.

Characteristics of a code embedding device according to a second embodiment will be explained next. The code embedding device 100 according to the first embodiment described above registers information indicating the usability of the code as the code use information, whereas the code embedding device according to the second embodiment registers information indicating a use time-limit of the code (the time-limit until which use of the code is permitted) as the code use information. The code embedding device according to the second embodiment determines whether the code that is embedded in the image can be used based on the use time-limit of the code.

The code embedding device according to the second embodiment registers the use time-limit of the code as code use information, and the code authenticating device determines whether to permit use of the code based on the use time-limit of the code, thereby solving problems such as unrestricted use of the code embedded in the image. Similar to the first embodiment, the code embedding device and the code authenticating device according to the second embodiment are connected via a network.

Figure 12:
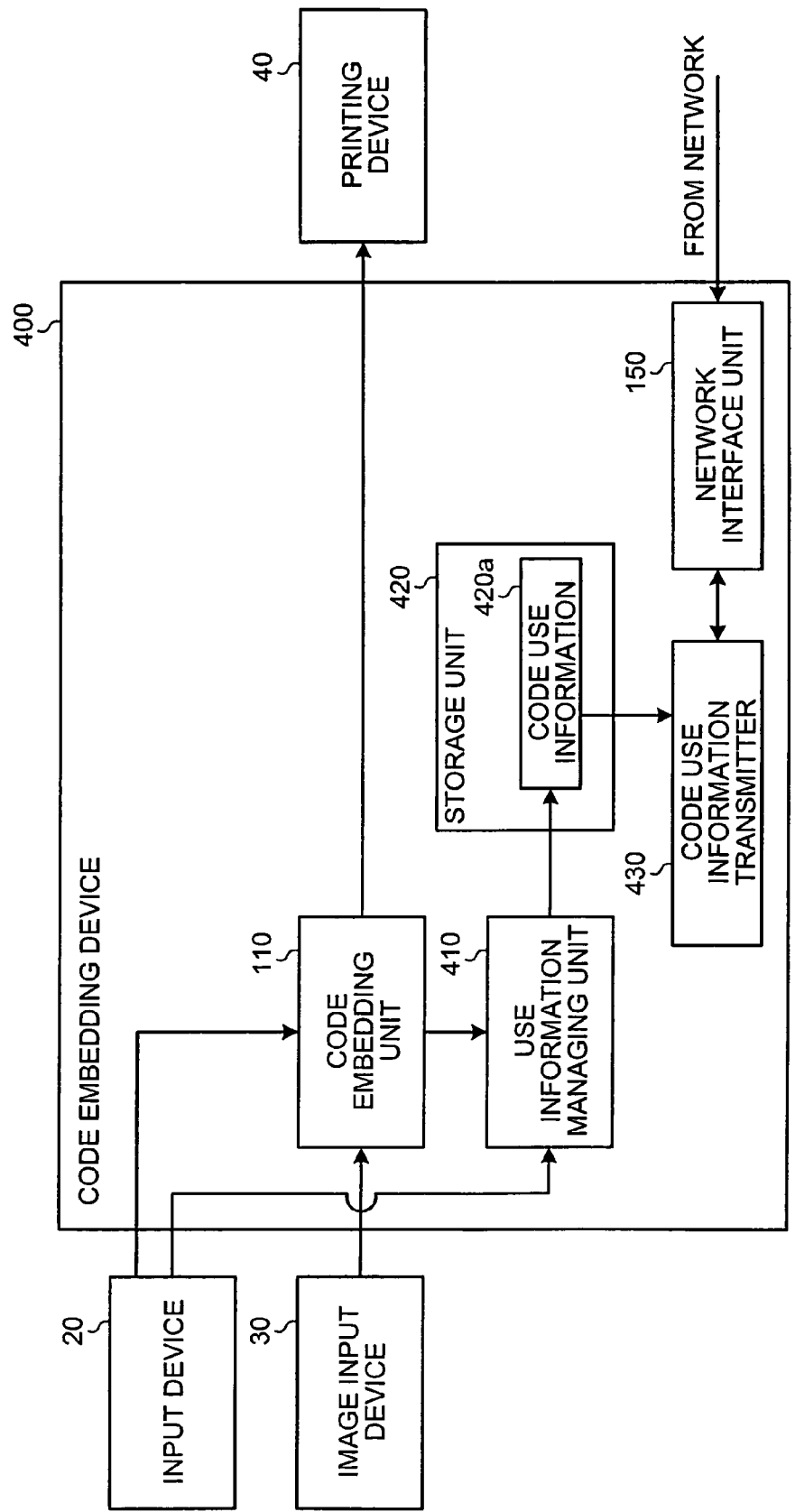
FIG. 12 is a functional block diagram of a code embedding device according to a second embodiment.

The configuration of the code embedding device according to the second embodiment will be explained next. FIG. 12 is a functional block diagram of the configuration of the code embedding device according to the second embodiment. As shown in FIG. 12, a code embedding device 400 includes a use information managing unit 410, a storage unit 420, and a code use information transmitter 430. Since other configurations and elements are the same as the code embedding device 100 shown in FIG. 2, they are designated with like reference numerals and are not explained again.

The use information managing unit 410 is a processor that obtains a code embedded in image data from the code embedding unit 110, obtains information indicating the use time-limit of the code from the input device 20, and, based on the information thus obtained, creates code use information. The use information managing unit 120 stores the created code use information in the storage unit 420.

The storage unit 420 stores the code use information 420a. FIG. 13 is an example of a data structure of the code use information 420a according to the second embodiment. As shown in FIG. 13, the code use information 420a includes "code" and "use time-limit". In the example of FIG. 13, the use time-limit of code "0001" is "Sep. 1, 2005", and the use time-limit of code "0002" is "Sep. 30, 2005".

The code use information transmitter 430 is a processor that, when an inquiry indicating a use time-limit of a code is received from a code authenticating device, retrieves the information indicating the usability of the corresponding code from the code use information 420a and transmits the retrieved information to the code authenticating device. For example, when the code use information transmitter 430 receives an inquiry relating to the use time-limit of the code "0001", it transmits information indicating that the use time-limit of the code "0001" is "2005.9.1" to the code authenticating device.

Figure 14:
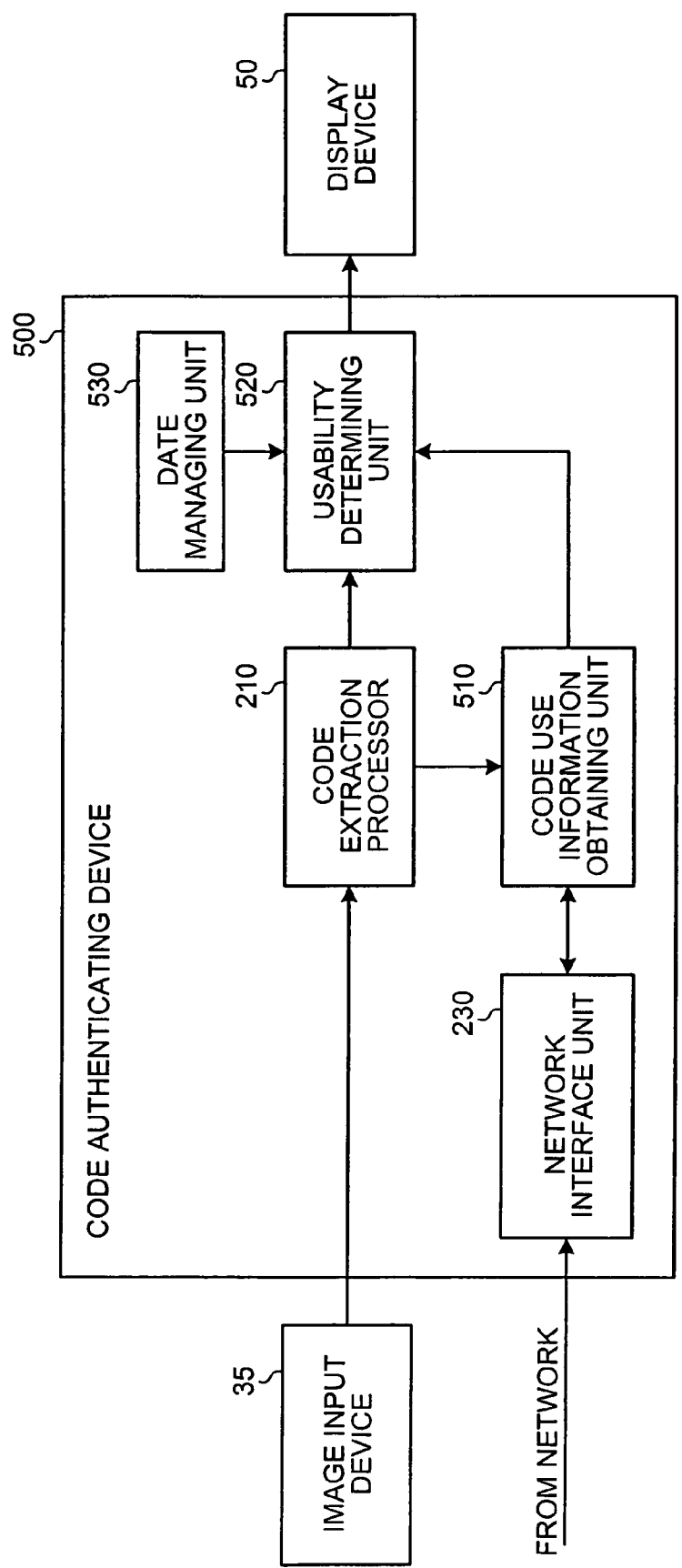
FIG. 14 is a functional block diagram of a code authenticating device according to the second embodiment.

The configuration of a code authenticating device according to the second embodiment will be explained next. FIG. 14 is a functional block diagram of the configuration of a code authenticating device according to the second embodiment. As shown in FIG. 14, a code authenticating device 500 includes a code use information obtaining unit 510, a usability determining unit 520, and a date managing unit 530. Since other configurations and elements are the same as the code authenticating device 200 shown in FIG. 7, they are designated with like reference numerals and are not explained again.

The code use information obtaining unit 510 is a processor that, when it receives a code from the code extraction processor 210, requests information indicating the use time-limit of the code from the code embedding device 400 shown in FIG. 12. Specifically, when the code use information obtaining unit 510 obtains the code "0001" from the code extraction processor 210, it requests information indicating the use time-limit of the code "0001" from the code embedding device 100.

When the code use information obtaining unit 510 receives a reply from the code embedding device 400 (for example, the use time-limit of code "0001" is "2005.9.1"), it sends the received information to the usability determining unit 520.

The usability determining unit 520 is a processor that determines whether a code extracted by the code extraction processor 210 can be used. Specifically, the usability determining unit 520 obtains the code from the code extraction processor 210, obtains information indicating the use time-limit of the code from the code use information obtaining unit 510, and obtains information indicating the present year, month, and date (hereinafter, "date information") from the date managing unit 530 (the date managing unit 530 is a processor that manages the present year, month, and date). When the code can be used, the usability determining unit 520 outputs information indicating that the code can be used to the display device 50. When the code cannot be used, the usability determining unit 520 outputs information indicating that the code cannot be used to the display device 50.

For example, if the usability determining unit 520 obtains the code "0001" from the code extraction processor 210, obtains information indicating that "the use time-limit of this code is 2005.9.1" from the code use information obtaining unit 510, and obtains date information of "2005.8.20" from the date managing unit 530, since the use time-limit has not been exceeded, the usability determining unit 240 determines that the code "0001" can be used.

On the other hand, if the usability determining unit 520 obtains the code "0001" from the code extraction processor 210, obtains information indicating that "the use time-limit of this code is 2005.9.1" from the code use information obtaining unit 510, and obtains date information of "2005.9.20" from the date managing unit 530, since the use time-limit has been exceeded, the usability determining unit 240 determines that the code "0001" cannot be used.

In the second embodiment, when the information obtained by the usability determining unit 520 from the code use information obtaining unit 510 is the same year, month, and date as the date information obtained from the date managing unit 530, the usability determining unit 520 determines that the corresponding code can be used.

Figure 15:
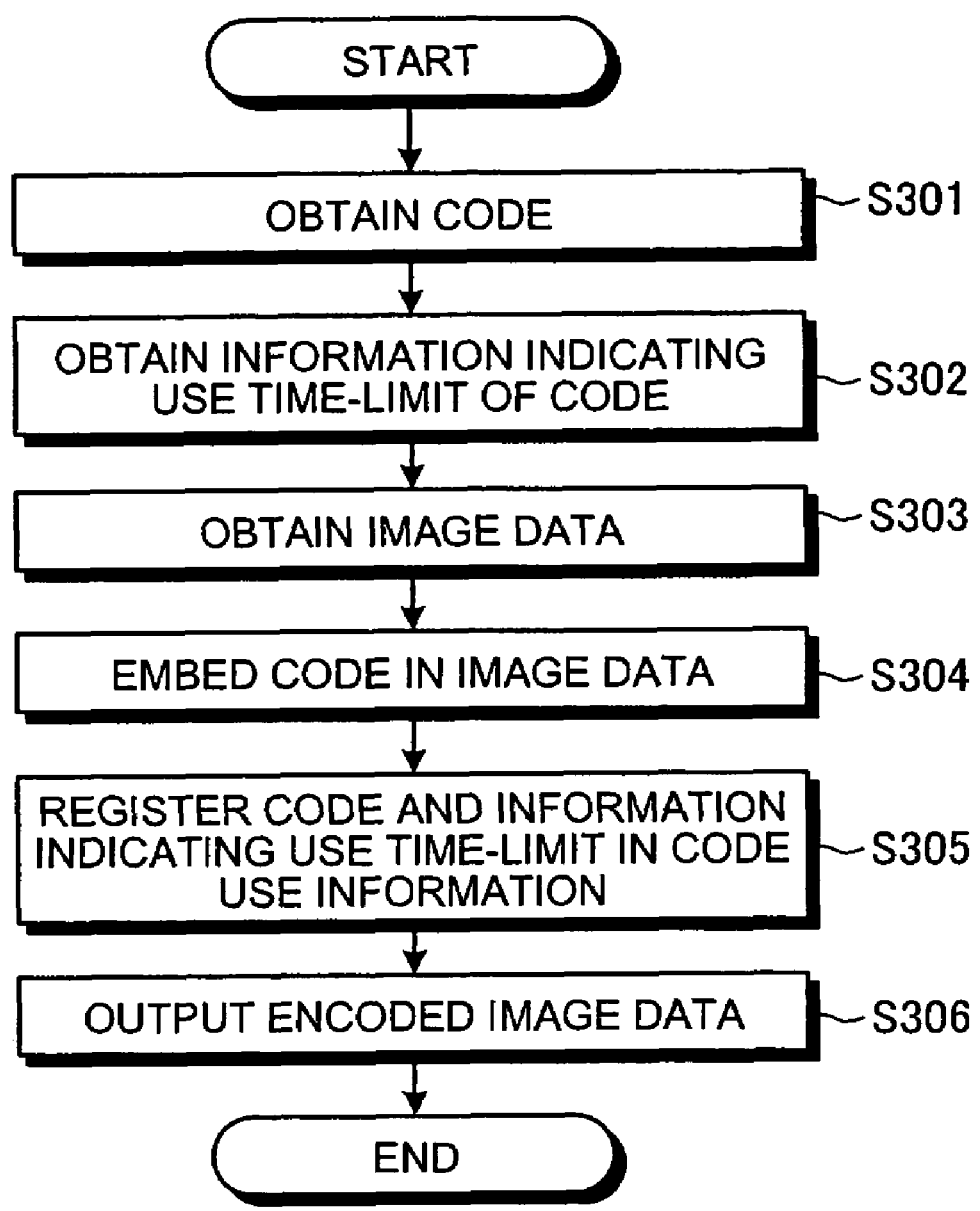
FIG. 15 is a flowchart of a process performed by the code embedding device according to the second embodiment.

A process performed by the code embedding device 400 according to the second embodiment will be explained next. FIG. 15 is a flowchart of a process performed by the code embedding device 400 according to the second embodiment. As shown in FIG. 15, the code embedding unit 110 of the code embedding device 400 obtains a code from the input device 20 (step S301), and the use information managing unit 410 obtains information indicating the use time-limit of the code from the input device 20 (step S302).

The code embedding unit 110 obtains the image data from the image input device 30 (step S303), and embeds a code in the image data (step S304). The use information managing unit 410 obtains the code embedded in the image data from the code embedding unit 110 and registers the code and information indicating the use time-limit of the code in the code use information 420a (step S305), and the code embedding unit 110 outputs the encoded image data to the printing device 40 (step S306).

Since the use information managing unit 410 of the code embedding device 400 creates code use information that restricts the code embedded in the image data and registers the created code use information (code use time-limit) in the storage unit 420, the code embedded in the image data can be prevented from being used unrestrictedly.

A process performed by the code authenticating device 500 according to the second embodiment will be explained next.

Figure 16:
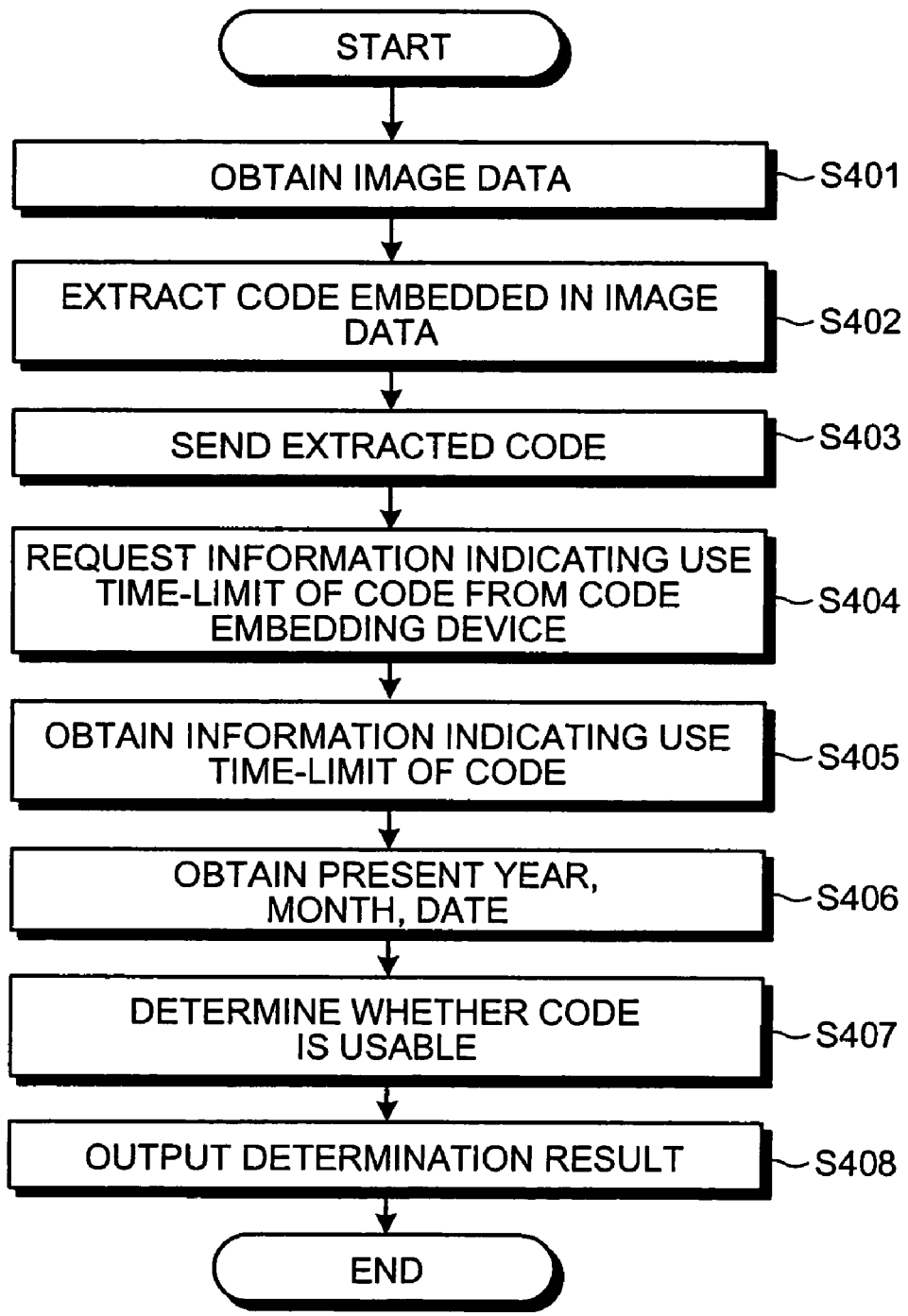
FIG. 16 is a flowchart of a process performed by the code authenticating device according to the second embodiment.

FIG. 16 is a flowchart of a process performed by the code authenticating device 500 according to the second embodiment. As shown in FIG. 16, the code extraction processor 210 of the code authenticating device 500 obtains image data from the image input device 35 (step S401) and extracts a code that is embedded in the image data (step S402).

The code extraction processor 210 sends the extracted code to the code use information obtaining unit 510 and the usability determining unit 520 (step S403). The code use information obtaining unit 510 requests information indicating the use time-limit of the code from the code embedding device 400 (step S404), obtains the information indicating the use time-limit of the code from the code embedding device 400, and sends the obtained information to the usability determining unit 520 (step S405).

The usability determining unit 520 obtains information indicating the present year, month, and date from the date managing unit 530 (step S406), determines whether the code can be used based on the information indicating the use time-limit of the code that is obtained from the code use information obtaining unit 510 (step S407), and outputs the determination result to the display device 50 (step S408).

When the usability determining unit 520 determines that the use time-limit of the code extracted by the code extraction processor 210 has been exceeded, it makes the display device 50 display "This code cannot be used". On the other hand, when the usability determining unit 520 determines that the use time-limit of the code extracted by the code extraction processor 210 has not been exceeded, it makes the display device 50 display "This code can be used".

Thus the code extraction processor 210 of the code authenticating device 500 extracts the code from the image data, the code use information obtaining unit 510 obtains the information indicating the use time-limit of the code from the code embedding device 400, and the usability determining unit 520 determines whether the code can be used. Therefore, the use time-limit of the code that is embedded in the printed matter can be restricted.

As described above, according to the code embedding device 400 of the second embodiment, the code embedding unit 110 obtains the code and the image data, uses difference in the average density of the image data to embed the code, and creates encoded image data. The use information managing unit 410 registers the information indicating the use time-limit of the code embedded by the code embedding unit 110 in the code use information 420a. The code use information transmitter 430 retrieves the information indicating the use time-limit corresponding to that code from the code use information 420a in response to a request from the code authenticating device 500, and transmits it to the code authenticating device 500. Therefore, the code that is embedded in the printed matter created by the code embedding device 400 can be restricted efficiently.

The code extraction processor 210 of the code authenticating device 500 uses the difference in average density of the image data to extract the code from the image data created by the code embedding device 400, and the code use information obtaining unit 510 obtains information indicating the use time-limit of the code by making a request for the information from the code embedding device 400. Based on the information indicating the use time-limit of the code and present date information, the usability determining unit 520 determines the usability of the code and outputs the determination result to the display device 50. This solves the problem of the code embedded in the image data being used unrestrictedly.

Characteristics of a code embedding device according to a third embodiment will be explained next. The code embedding device according to the third embodiment uses a method similar to that of the first embodiment to embed a code in image data, and stores information indicating the number of valid uses of the embedded coded as code use information.

A code authenticating device according to the third embodiment extracts the code embedded in a printed matter that is printed by the code embedding device, obtains the code use information corresponding to the extracted code from the code embedding device, and determines whether the extracted code can be used, i.e., whether the number of valid uses is 0.

Since the code embedding device according to the third embodiment registers information indicating the number of valid uses of the code as the code use information, and the code authenticating device determines whether to permit use of the code based on the number of valid uses of that code, it becomes possible to prevent the code embedded in the image from being used without permission. Similar to the first embodiment, it is assumed that the code embedding device and the code authenticating device according to the third embodiment are connected via a network.

Figure 17:
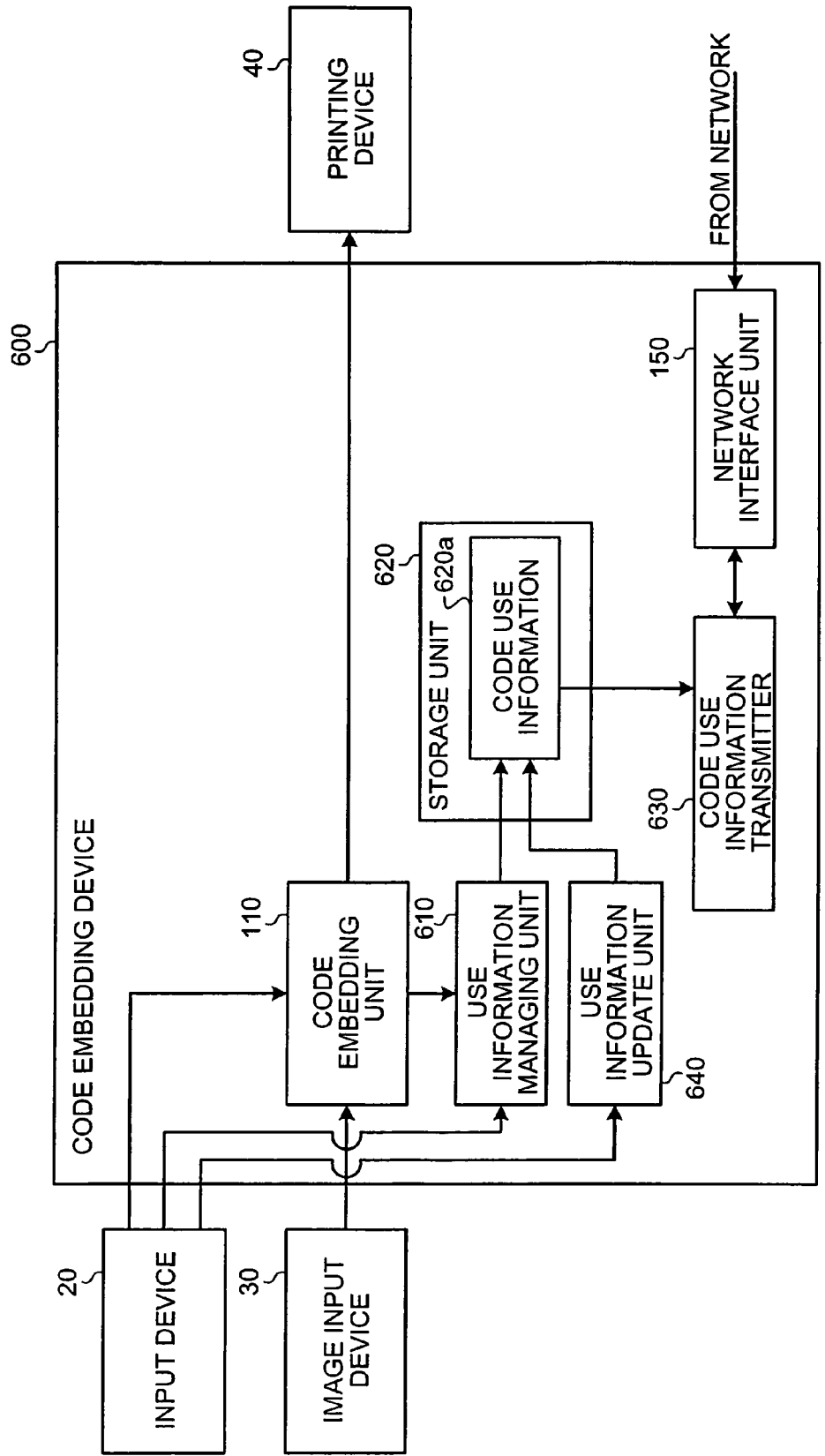
FIG. 17 is a functional block diagram of a code embedding device according to a third embodiment.

The configuration of the code embedding device according to the third embodiment will be explained next. FIG. 17 is a functional block diagram of the configuration of the code embedding device according to the third embodiment. As shown in FIG. 17, a code embedding device 600 includes a use information managing unit 610, a storage unit 620, a code use information transmitter 630, and a use information update unit 640. Since other configurations and elements are the same as the code embedding device 100 shown in FIG. 2, they are designated with like reference numerals and are not explained again.

The use information managing unit 610 is a processor that obtains a code embedded in image data, obtains information indicating the number of valid uses of the code from the input device 20, and creates code use information based on the obtained information. The use information managing unit 610 stores the created code use information in the storage unit 620.

The storage unit 620 stores code use information 620a. FIG. 18 is an example of a data structure of the code use information 620a. As shown in FIG. 18, the code use information 620a includes "code" and "number of valid uses". In the example of FIG. 18, the number of valid uses of code "0001" is "10", and the number of valid uses of code "0002" is "9".

The code use information transmitter 630 is a processor that, when it receives an inquiry relating to the number of valid uses of a code from a code authenticating device, retrieves the information indicating the number of valid uses of the corresponding code from the code use information 620a, transmits the retrieved information to the code authenticating device, and subtracts 1 from the number of valid uses.

For example, when the code use information transmitter 630 receives an inquiry relating to the number of valid uses of the code "0001", it transmits information indicating that the number of valid uses of the code "0001" is "10" to the code authenticating device and subtracts 1 from the number of valid uses. In the above example, the code use information transmitter 630 changes the number of valid uses from "10" to "9".

When the number of valid uses that is the target of subtraction is "0", the code use information transmitter 630 does not subtract (it leaves the number of valid uses at "0").

The use information update unit 640 is a processor that, when it obtains a code to be updated and new information indicating the number of valid uses of that code from the input device 20, updates the code use information 620a. For example, when the use information update unit 640 receives code "0001" and the number of valid uses "5" from the input device 20, it updates the number of valid uses of the code "0001" in FIG. 18 from "10" to "5".

Figure 19:
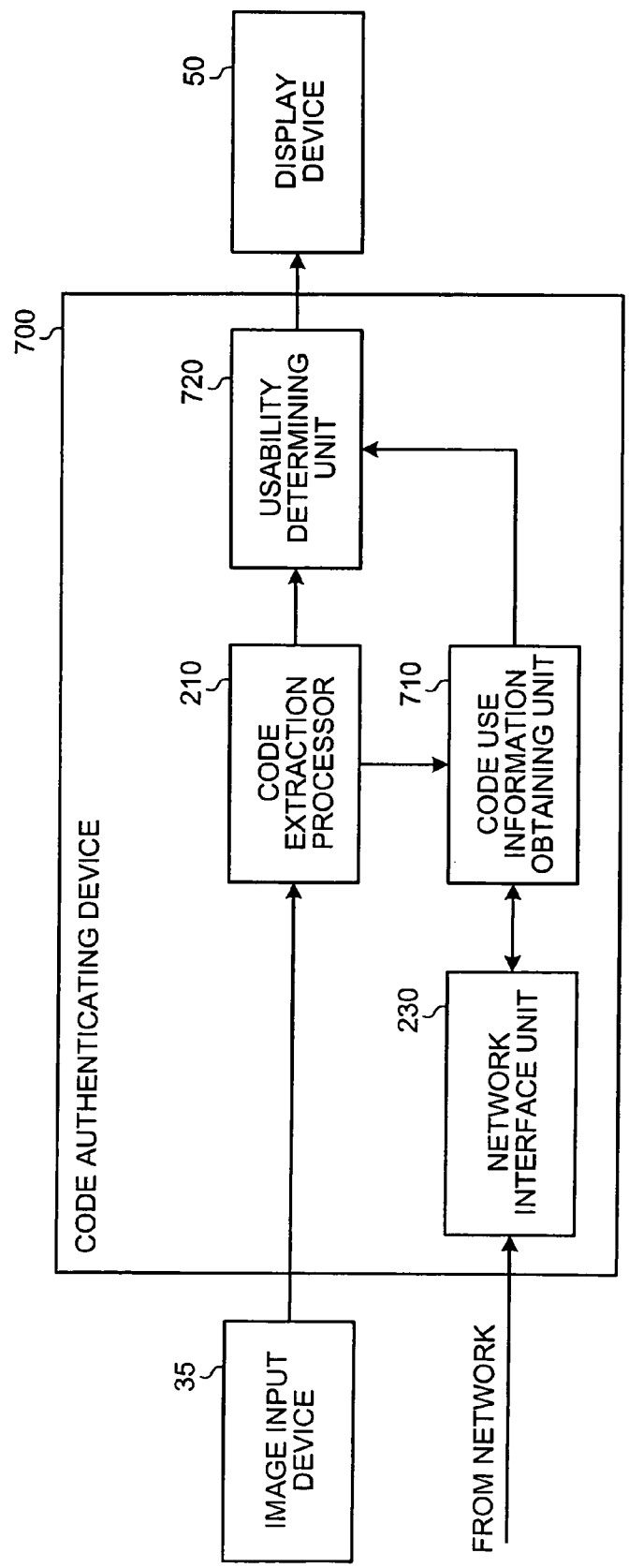
FIG. 19 is a functional block diagram of a code authenticating device according to the third embodiment.

The configuration of a code authenticating device according to the third embodiment will be explained next. FIG. 19 is a functional block diagram of the configuration of a code authenticating device according to the third embodiment. As shown in FIG. 19, a code authenticating device 700 includes a code use information obtaining unit 710 and a usability determining unit 720. Since other configurations and elements are the same as the code authenticating device 200 shown in FIG. 7, they are designated with like reference numerals and are not explained again.

The code use information obtaining unit 710 is a processor that, when it receives a code from the code extraction processor 210, requests information indicating the number of valid uses of the code from the code embedding device 600 shown in FIG. 17. Specifically, when the code use information obtaining unit 710 obtains the code "0001" from the code extraction processor 210, it requests information indicating the number of valid uses of the code "0001" from the code embedding device 600.

When the code use information obtaining unit 710 receives a reply (for example, the number of valid uses for code "0001" is "10") from the code embedding device 600, it sends the received information to the usability determining unit 720.

The usability determining unit 720 is a processor that determines whether a code extracted by the code extraction processor 210 can be used. Specifically, the usability determining unit 720 obtains a code from the code extraction processor 210, and obtains code use information from the code use information obtaining unit 710. When the usability determining unit 720 determines that the code can be used, it outputs information indicating that the code can be used to the display device 50. When it determines that the code cannot be used, it outputs information indicating that the code cannot be used to the display device 50.

For example, when the usability determining unit 720 obtains the code "0001" from the code extraction processor 210 and obtains information that indicates "10" as the number of valid uses from the code use information obtaining unit 710, since the number of valid uses of the code "0001" is one or greater (not 0), the usability determining unit 720 determines that the code "0001" can be used.

On the other hand, when the usability determining unit 720 obtains the code "0001" from the code extraction processor 210 and obtains information that indicates "0" as the number of valid uses from the code use information obtaining unit 710, since the number of valid uses of the code "0001" is 0, the usability determining unit 720 determines that the code "0001" cannot be used.

Figure 20:
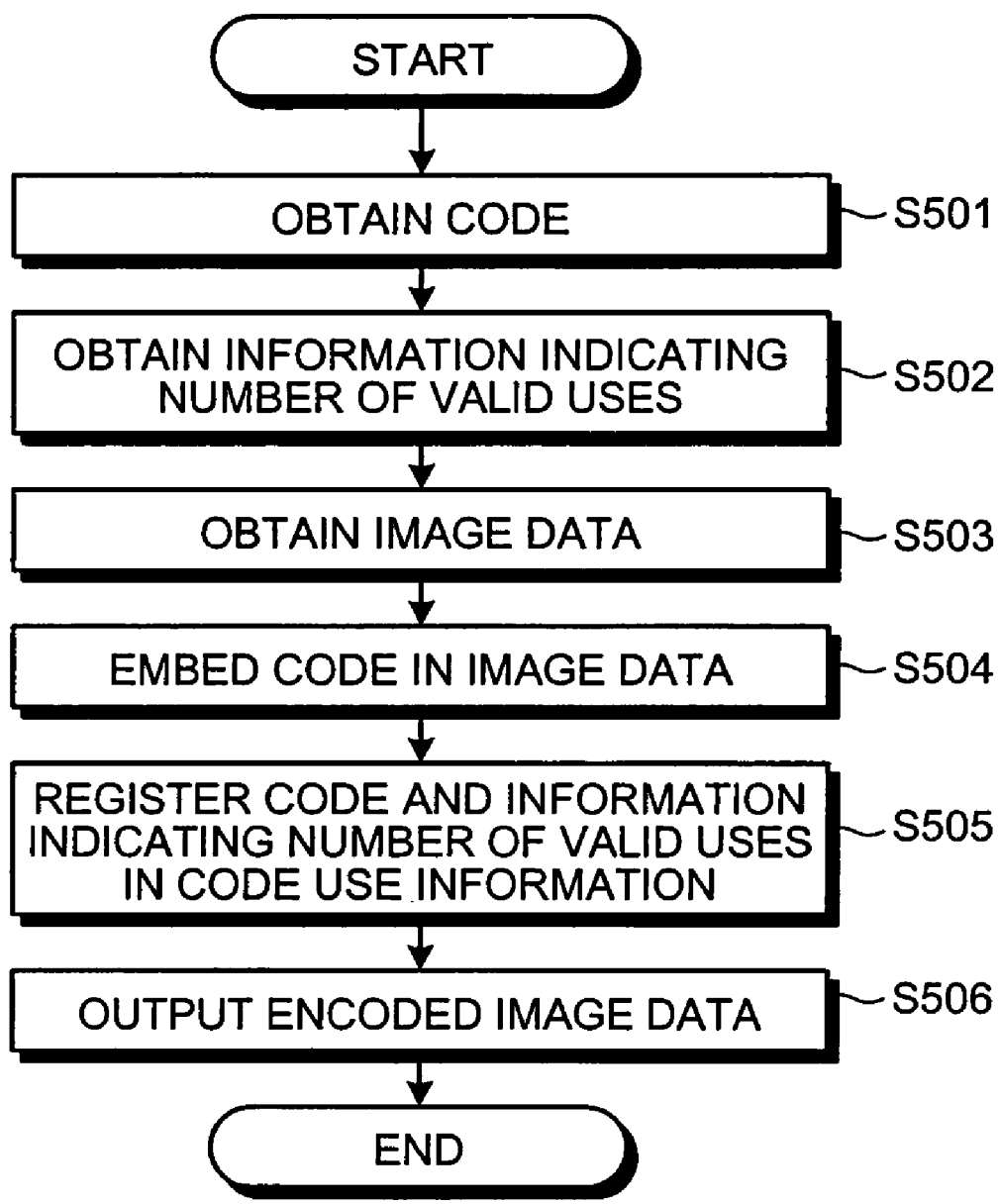
FIG. 20 is a flowchart of a process performed by the code embedding device according to the third embodiment.

A process performed by the code embedding device 600 according to the third embodiment will be explained next. FIG. 20 is a flowchart of a process performed by the code embedding device 600 according to the third embodiment. As shown in FIG. 20, the code embedding unit 110 of the code embedding device 600 obtains a code from the input device 20 (step S501) and the use information managing unit 610 obtains information indicating the number of valid uses of the code from the input device 20 (step S502).

The code embedding unit 110 obtains image data from the image input device 30 (step S503) and embeds the code in the image data (step S504). The use information managing unit 610 obtains the code embedded in the image from the code embedding unit 110, and registers the code and the information indicating the number of valid uses of the code in the code use information 620a (step S505). The code embedding unit 110 outputs encoded image data to the printing device 40 (step S506).

Since the use information managing unit 610 of the code embedding device 600 creates code use information that restricts the number of valid uses of the code that is embedded in the image data and registers the created code use information in the storage unit 620, the code embedded in the image can be prevented from being used unrestrictedly.

Figure 21:
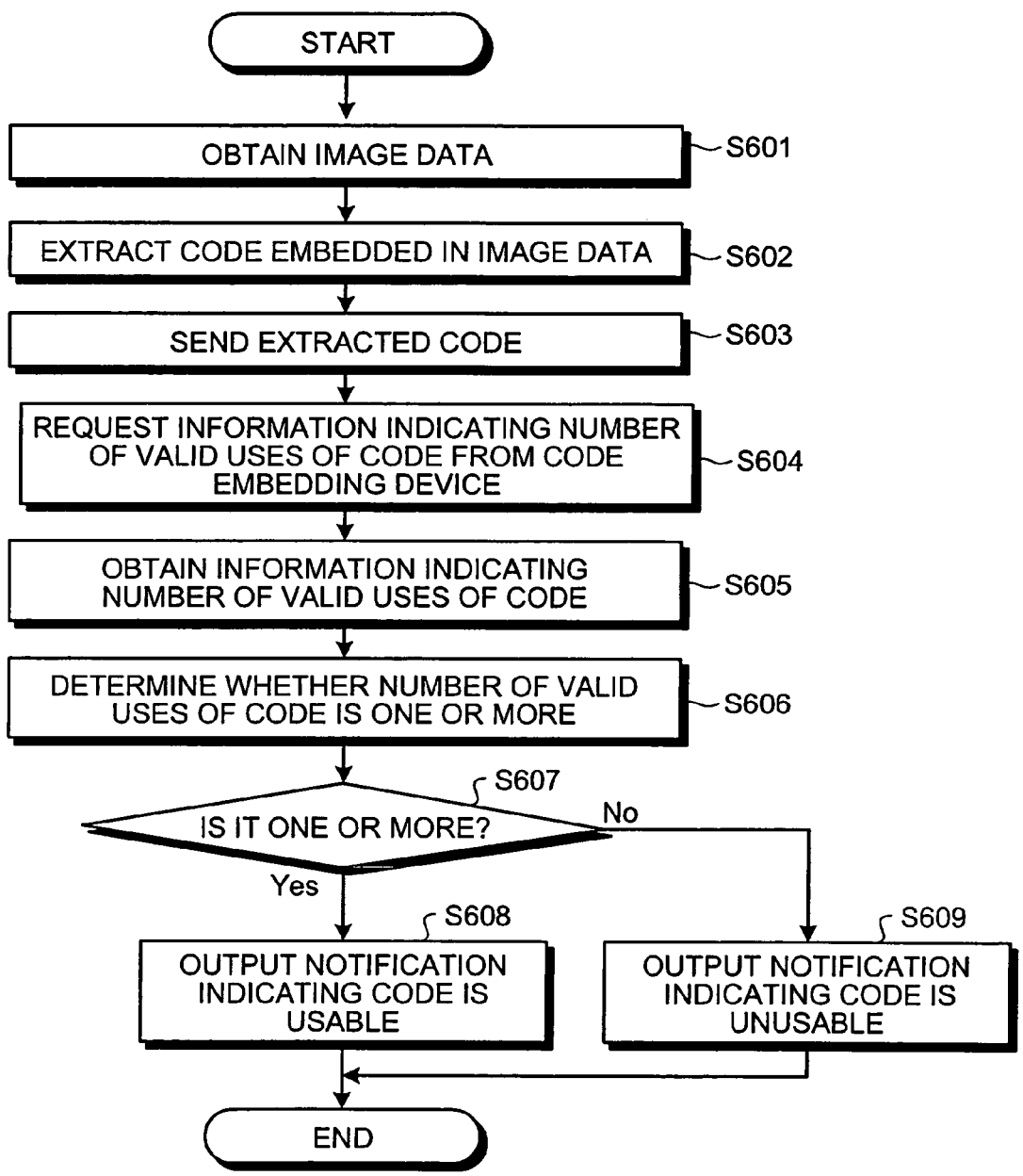
FIG. 21 is a flowchart of a process performed by the code authenticating device according to the third embodiment.

A process performed by the code authenticating device 700 according to the third embodiment will be explained next. FIG. 21 is a flowchart of a process performed by the code authenticating device 700 according to the third embodiment. As shown in FIG. 21, the code extraction processor 210 of the code authenticating device 700 obtains image data from the image input device 35 (step S601) and extracts a code that is embedded in the image data (step S602).

The code extraction processor 210 sends the extracted code to the code use information obtaining unit 710 and the usability determining unit 720 (step S603). The code use information obtaining unit 710 requests information indicating the number of valid uses of the code from the code embedding device 600 (step S604), obtains the information indicating the number of valid uses of the code from the code embedding device 600, and sends the obtained information to the usability determining unit 720 (step S605).

The usability determining unit 720 determines whether the number of valid uses is one or more (step S606), and, when it is one or more (step S607: Yes), outputs the fact that the code can be used to the display device 50 (step S608), and, when it is 0, outputs the fact that the code cannot be used to the display device 50 (step S609).

Thus, the code authenticating device 700 uses the code extraction processor 210 to extract the code from the image data, the code use information obtaining unit 710 obtains the number of valid uses of the code from the code embedding device 600, and the usability determining unit 720 determines whether the code can be used. This enables the manager or the like to restrict the number of uses of the code embedded in the printed matter as he desires.

As described above, in the code embedding device 600 according to the third embodiment, the code embedding unit 110 obtains the code and the image data, uses the difference in average density of the image data to embed the code, and creates encoded image data. The use information managing unit 610 registers information indicating the number of valid uses of the code embedded by the code embedding unit 110 in the code use information 620a. In response to a request from the code authenticating device 700, the code use information transmitter 630 retrieves the information indicating the number of valid uses of the corresponding code from the code use information 620a, and transmits it to the code authenticating device 700. This makes it possible to efficiently restrict the number of uses of the code that is embedded in the printed mater created by the code embedding device 600.

In the code authenticating device 700, the code extraction processor 210 uses the difference in average density of the image data to extract the code from the image data created by the code embedding device 600, and the code use information obtaining unit 710 obtains information indicating the number of valid uses of the code by making a request for the information from the code embedding device 600. Based on the information indicating the number of valid uses of the code, the usability determining unit 720 determines the usability of the code and outputs the determination result to the display device 50, thereby solving the problem of the code embedded in the image data being used unrestrictedly.

Characteristics of a code embedding device according to a fourth embodiment will be explained next. The code embedding device according to the fourth embodiment uses a method similar to that of the first embodiment to embed a code in image data. In addition, it randomly determines information indicating the usability of the embedded code and stores this information. When the code embedding device according to the fourth embodiment receives a request for information indicating the usability of the code from a code authenticating device, it transmits the information indicating the usability of the code to the code authenticating device, randomly determines information indicating the usability of the code once again, and updates the information indicating the usability of the code.

Since the code embedding device according to the fourth embodiment randomly determines and stores the information indicating the usability of the code, even if a plurality of identical codes are issued, the use frequencies of the codes can be restricted. For example, even if identical codes are issued to a plurality of customers, since the usability of the issued codes is randomly changed, the code embedding device according to the fourth embodiment can be used in implementing a raffle service or the like without creating special codes.

Like in the first embodiment, it is assumed that the code embedding device and the code authenticating device according to the fourth embodiment are connected via a network. Since the code authenticating device according to the fourth embodiment is identical to the code authenticating device 200 according to the first embodiment, it will be not explained again.

Figure 22:
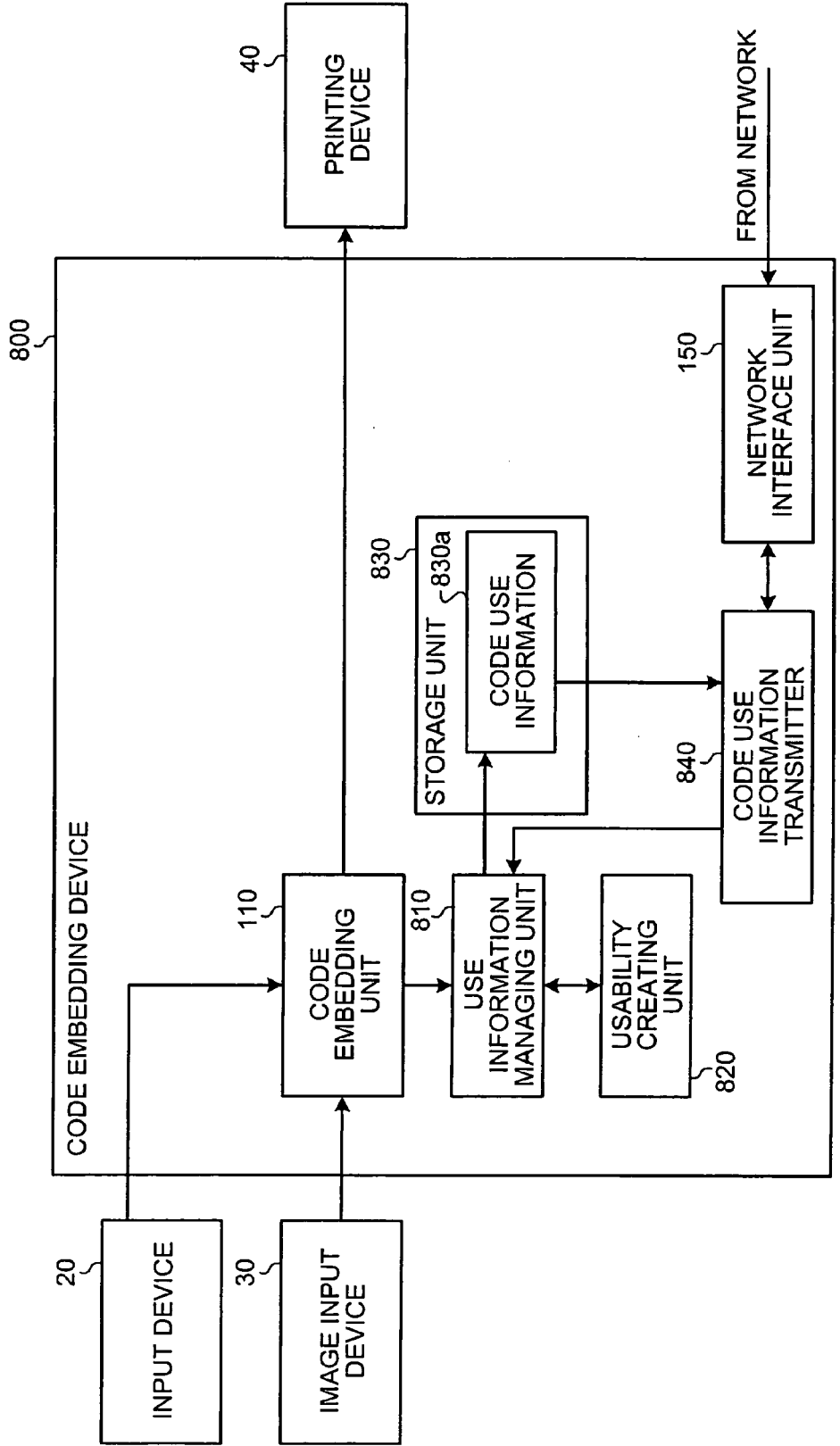
FIG. 22 is a functional block diagram of a code embedding device according to a fourth embodiment.

The configuration of the code embedding device according to the fourth embodiment will be explained. FIG. 22 is a functional block diagram of the configuration of the code embedding device according to the fourth embodiment. As shown in FIG. 22, a code embedding device 800 includes a use information managing unit 810, a usability creating unit 820, a storage unit 830, and a code use information transmitter 840. Since other configurations and elements are the same as the code embedding device 100 shown in FIG. 2, they are designated with like reference numerals and are not explained again.

The use information managing unit 810 is a processor that, when it obtains a code embedded in image data from the code embedding unit 110, requests information indicating the usability of the code from the usability creating unit 820, and creates code use information based on the information indicating the usability of the code obtained from the usability creating unit 820 and the code obtained from the code embedding unit 110.

When the usability creating unit 820 receives the information indicating the usability of the code embedded in the image data from the use information managing unit 810, it determines whether to make the usability of the code "Usable" or "Unusable", and sends information that indicates the determined usability to the use information managing unit 810. The usability creating unit 820 can use any random determination method to determine the usability of the code. For example, the usability of the code can be randomly determined by generating a random number and setting the usability of the code to "Usable" if the generated number is an odd number and to "Unusable" if the number is an even number.

Returning to the explanation of the use information managing unit 810, the use information managing unit 810 stores the created code use information in the storage unit 830.

When the use information managing unit 810 obtains the code from the code use information transmitter 840 (when the code use information transmitter 840 receives an inquiry relating to the usability of the code from a code authenticating device, it sends the code to the use information managing unit 810), it once again requests information indicating the usability of the code from the usability creating unit 820, and updates the information indicating the usability of the code obtained from the code use information transmitter 840 according to the information indicating the usability of the code obtained from the usability creating unit 820.

The storage unit 830 stores code use information 830a. The data structure of the code use information 830a is the same as that of the code use information 130a shown in FIG. 6, and will not be explained again.

The code use information transmitter 840 is a processor that, when it receives an inquiry relating to the usability of a code from the code authenticating device, retrieves information indicating the usability of that code from the code use information 830a and transmits the retrieved information to the code authenticating device. When the code use information transmitter 840 receives an inquiry relating to the usability of the code from the code authenticating device, it sends the code that is the target of the inquiry to the use information managing unit 810.

Figure 23:
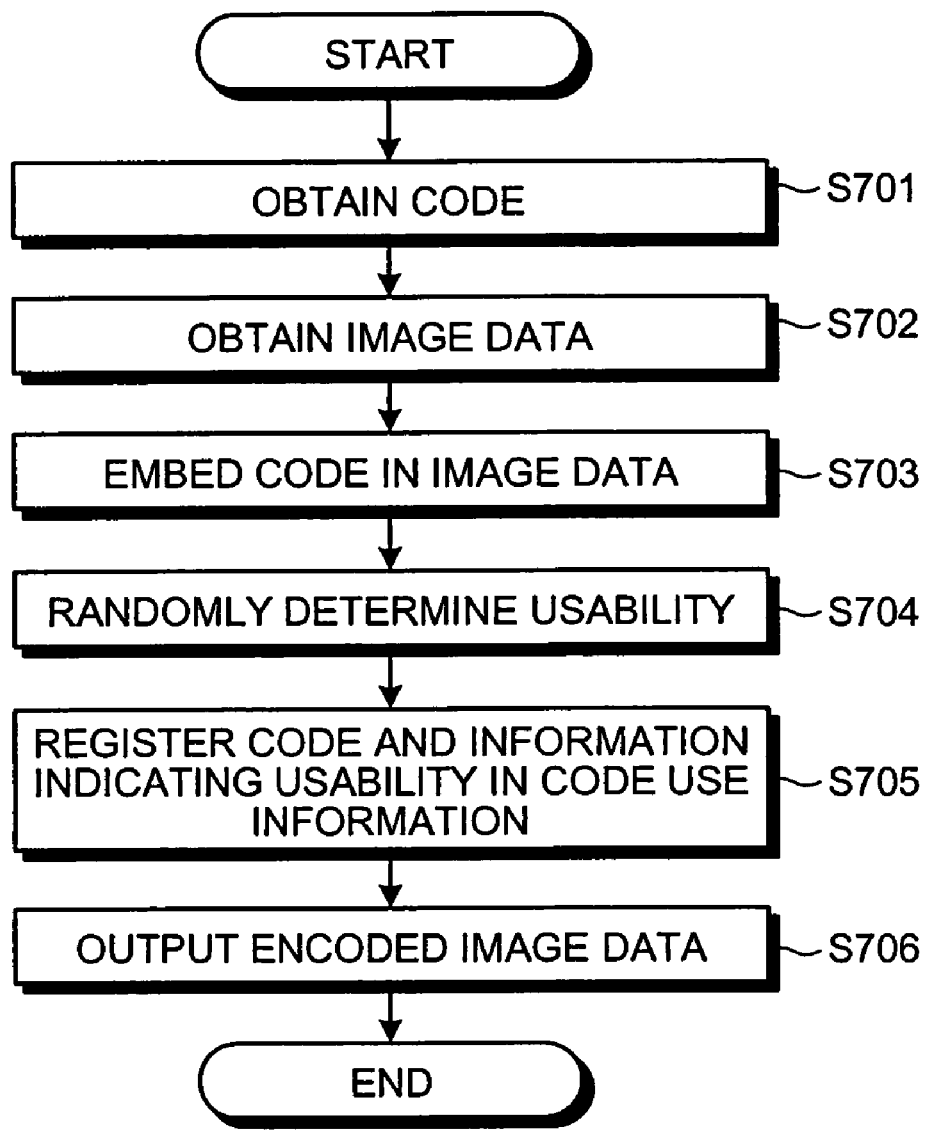
FIG. 23 is a flowchart of a process performed by the code embedding device according to the fourth embodiment.

A process performed by the code embedding device 800 according to the fourth embodiment will be explained next. FIG. 23 is a flowchart of a process performed by the code embedding device 800 according to the fourth embodiment. As shown in FIG. 23, the code embedding unit 110 of the code embedding device 800 obtains a code from the input device 20 (step S701) and obtains image data from the image input device 30 (step S702).

The code embedding unit 110 embeds the code in the image (step S703). The usability creating unit 820 randomly determines usability for the code and sends information indicating the determined usability to the use information managing unit 810 (step S704).

The use information managing unit 810 registers the code and the information indicating the usability of the code in the code use information 830a (step S705), and the code embedding unit 110 outputs encoded image data to the printing device 40 (step S706).

According to the code embedding device 800, since the usability creating unit 820 randomly determines the information indicating the usability of the code and the use information managing unit 810 updates the information indicating the usability of the code registers in the code use information 830a, even when a plurality of identical codes are issued, the usability of the codes can be restricted.

Figure 24:
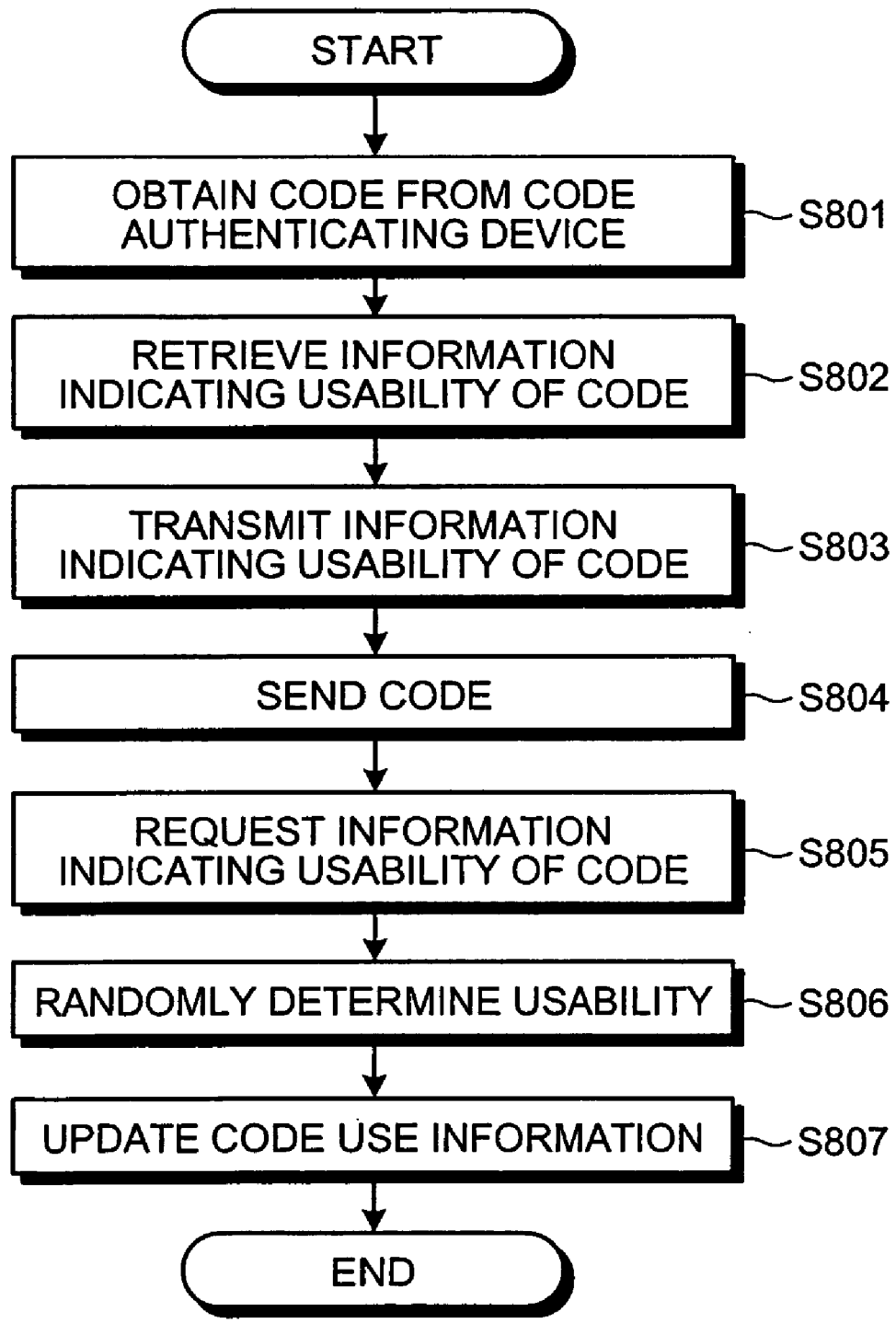
FIG. 24 is a flowchart of a process performed by the code embedding device upon receiving a request for information indicating usability of the code from a code authenticating device.

A process performed by the code embedding device 800 according to the fourth embodiment when it receives a request for information indicating the usability of a code from the code authenticating device will be explained next. FIG. 24 is a flowchart of a process performed by the code embedding device 800 according to the fourth embodiment when it receives a request for information indicating the usability of a code from a code authenticating device. As shown in FIG. 24, the code use information transmitter 840 of the code embedding device 800 obtains a code from a code authenticating device (step S801) and retrieves information indicating the usability of that code from the code use information 830a (step S802).

The code use information transmitter 840 then transmits the information indicating the usability of the code to the code authenticating device (step S803), and sends the code to the use information managing unit 810 (step S804). The use information managing unit 810 requests information indicating the usability of the code from the usability creating unit 820 (step S805).

The usability creating unit 820 randomly determines usability for the code, and sends information that indicates the determined usability to the use information managing unit 810 (step S806). The use information managing unit 810 updates the information indicating the usability in the code use information 830a (step S807).

Thus when the code embedding device 800 receives a request for information indicating the usability of the code from the code authenticating device, after transmitting information indicating the usability of the code to the code authenticating device, the usability creating unit 820 randomly creates a usability and the use information managing unit 810 updates the code use information 830a. Therefore, even when identical codes are embedded in a plurality of image data, use of the codes can be restricted.

As described above according to the code embedding device 800 of the fourth embodiment, the code embedding unit 110 obtains the code and the image data, uses the difference in average density of the image data to embed the code, and thereby creates encoded image data. The usability creating unit 820 then randomly determines usability for the code, and the use information managing unit 810 registers the randomly determined usability information in the code use information 830a. Therefore, even when a plurality of identical codes are issued, use of the codes can be restricted.

Characteristics of a code embedding device according to a fifth embodiment will be explained next. The code embedding device according to the fifth embodiment uses a method similar to that of the first embodiment to embed a first code in the image data. In addition, it creates a two-dimensional code from a second code, and stores information indicating the usability of a third code including the first code and the second code.

The code authenticating device according to the fifth embodiment extracts the first code embedded in the image data, obtains a second code by decoding a two-dimensional code, obtains information indicating the usability of a third code including the first code and the second code from the code embedding device, and determines whether the code is usable.

Thus the code embedding device according to the fifth embodiment uses two types of codes to increase the number of valid digits in the issued code. Since the code embedding device stores information indicating the usability of two types of codes, it can prevent unrestricted use of a code having an increased number of valid digits that includes the two types of codes. Similar to the first embodiment, the code embedding device and the code authenticating device according to the fifth embodiment are connected via a network.

Figure 25:
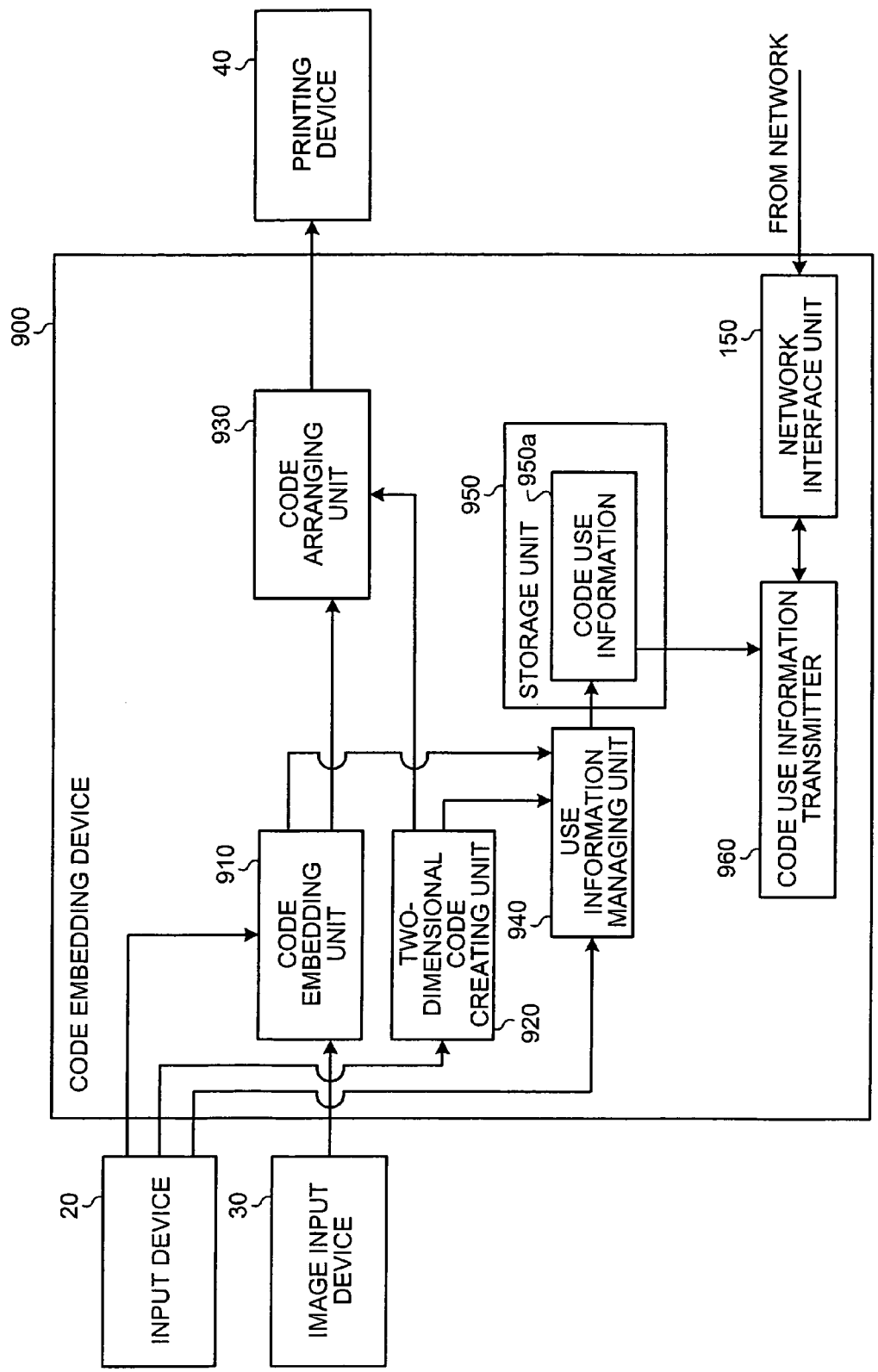
FIG. 25 is a functional block diagram of a code embedding device according to a fifth embodiment.

The configuration of the code embedding device according to the fifth embodiment will be explained next. FIG. 25 is a functional block diagram of the configuration of the code embedding device according to the fifth embodiment. As shown in FIG. 25, a code embedding device 900 includes a code embedding unit 910, a two-dimensional code creating unit 920, a code arranging unit 930, a use information managing unit 940, a storage unit 950, and a code use information transmitter 960. Since other configurations and elements are the same as the code embedding device 100 shown in FIG. 2, they are not explained again.

The code embedding unit 910 is a processor that obtains a first code from the input device 20, obtains image data from the image input device 30, and embeds the first code in the image data. Since the method for embedding the first code in the image data is the same as that of the code embedding unit 110 in the first embodiment, it will not be explained again.

The code embedding unit 910 sends the image data that the first code is embedded in (encoded image data) to the code arranging unit 930, and sends the first code that is embedded in the image data to the use information managing unit 940.

The two-dimensional code creating unit 920 is a two-dimensional code encoder that creates a two-dimensional code by encoding the second code obtained from the input device 20. A two-dimensional code is made by encoding information as a two-dimensionally shaped combination. The two-dimensional code creating unit 920 sends the created two-dimensional code to the code arranging unit 930, and sends the second code to the use information managing unit 940.

Figures 26, 27:
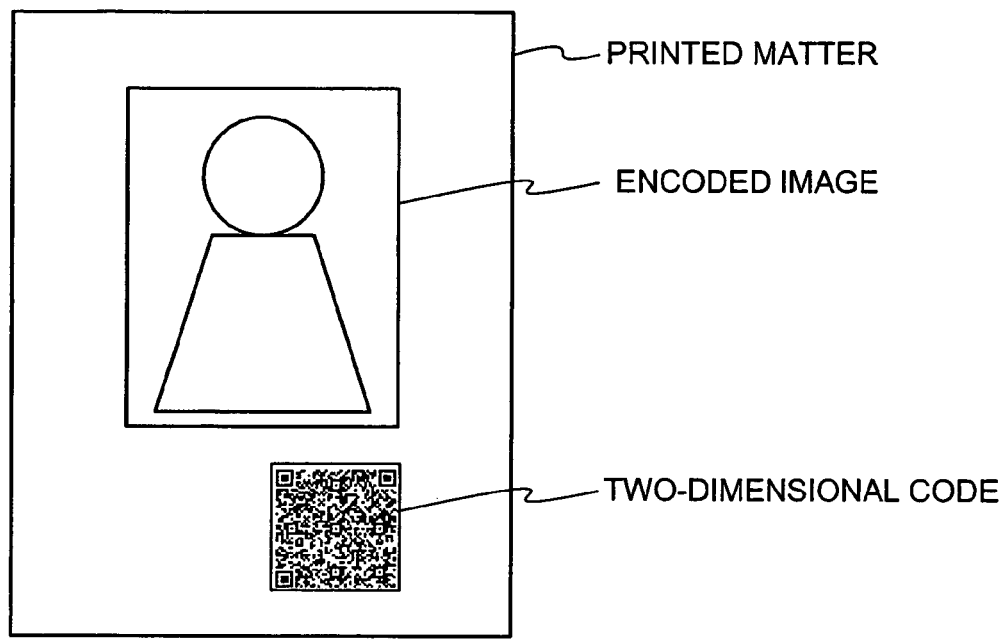
FIG. 26 is an example of a printed matter that is printed by a printing device according to the fifth embodiment.
FIG. 27 is an example of a data structure of code use information according to the fifth embodiment.

The code arranging unit 930 is a processor that arranges the encoded image data obtained from code embedding unit 910, and the two-dimensional code obtained from the two-dimensional code creating unit 920, at predetermined positions. The code arranging unit 930 outputs information indicating the encoded image data and the two-dimensional code that are arranged at predetermined positions to the printing device 40, and makes the printing device 40 to print the information and the two-dimensional code. FIG. 26 is one example of a printed matter that is printed by the printing device 40 according to the fifth embodiment. As shown in FIG. 26, an image in which the first code is embedded and the two-dimensional code are printed on the printed matter.

The use information managing unit 940 is a processor that obtains the first code from the code embedding unit 910, obtains the second code from the two-dimensional code creating unit 920, obtains information indicating the usability of a third code including the first code and the second code from the input device 20, and creates code use information based on the obtained information. The third code is made by appending the second code to the first code. For example, if the first code is "0000" and the second code is "1111", the third code becomes "00001111".

The storage unit 950 stores the code use information 950a. FIG. 27 is one example of the data structure of the code use information 950a according to the fifth embodiment. As shown in FIG. 27, the code use information 950a includes third "codes" and "usability" for each code. In the example of FIG. 27, it is indicated that third codes "00002222" and "11112222" are usable.

The code use information transmitter 960 is a processor that, when it receives an inquiry regarding the usability of a third code from the code authenticating device, retrieves information indicating the usability of the corresponding third code from the code use information 950a and transmits the retrieved information to the code authenticating device. For example, when the code use information transmitter 960 receives an inquiry regarding the usability of the third code "00002222" from a code authenticating device, it transmits information indicating that the third code "00002222" is usable to the code authenticating device (because, in FIG. 27, the usability of code "00002222" is "Usable").

Figure 28:
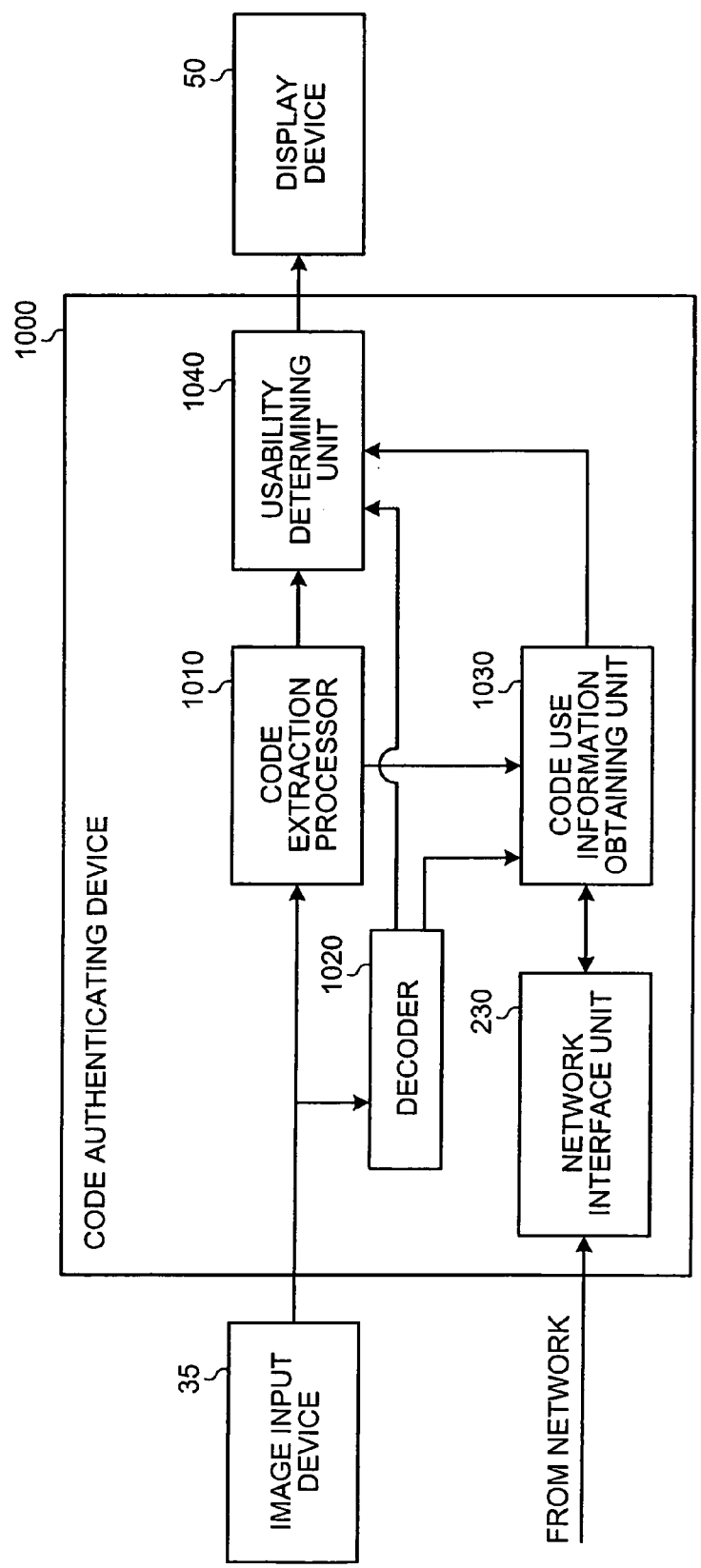
FIG. 28 is a functional block diagram of a code authenticating device according to the fifth embodiment.

The configuration of a code authenticating device according to the fifth embodiment will be explained next. FIG. 28 is a functional block diagram of the configuration of the code authenticating device according to the fifth embodiment. As shown in FIG. 28, a code authenticating device 1000 includes a code extraction processor 1010, a decoder 1020, a code use information obtaining unit 1030, and a usability determining unit 1040. Since other configurations and elements are the same as the code authenticating device 200 shown in FIG. 7, they are not explained again.

The code extraction processor 1010 obtains image data from the image input device 35 and extracts the first code from the obtained image data. The code extraction processor 1010 sends an extracted first code to the code use information obtaining unit 1030 and the usability determining unit 1040.

The decoder 1020 is a processor that decodes the two-dimensional code from the image input device 35 and extracts the second code. The decoder 1020 sends the extracted second code to the code use information obtaining unit 1030 and the usability determining unit 1040.

The code use information obtaining unit 1030 is a processor that obtains the first code from the code extraction processor 1010, obtains the second code from the decoder 1020, identifies the third code, and requests information indicating the usability of the third code from the code embedding device 900. Specifically, when the code use information obtaining unit 1030 obtains a first code of "0000" and a second code of "1111", it identifies the third code as "00001111" and requests information that indicates the usability of the third code "00001111" from the code embedding device 900.

When the code use information obtaining unit 1030 receives a reply from the code embedding device 900 (for example, code "00001111" is "Usable"), it sends the received information to the usability determining unit 1040.

The usability determining unit 1040 is a processor that obtains the first code from the code extraction processor 1010, obtains the second code from the decoder 1020, identifies the third code, obtains information indicating the usability of the third code from the code use information obtaining unit 1030, and determines whether the third code can be used. The usability determining unit 1040 outputs the determination result to the display device 50.

For example, when the usability determining unit 1040 obtains the first code "0000", the second code "1111", and information indicating the usability of the third code indicating "code 00001111 is usable", the usability determining unit 1040 determines that the code "00001111" can be used.

On the other hand, when the usability determining unit 1040 obtains the first code "0000", the second code "1111", and information indicating the usability of the third code indicating "code 00001111 is unusable", the usability determining unit 1040 determines that the code "00001111" cannot be used.

Figure 29:
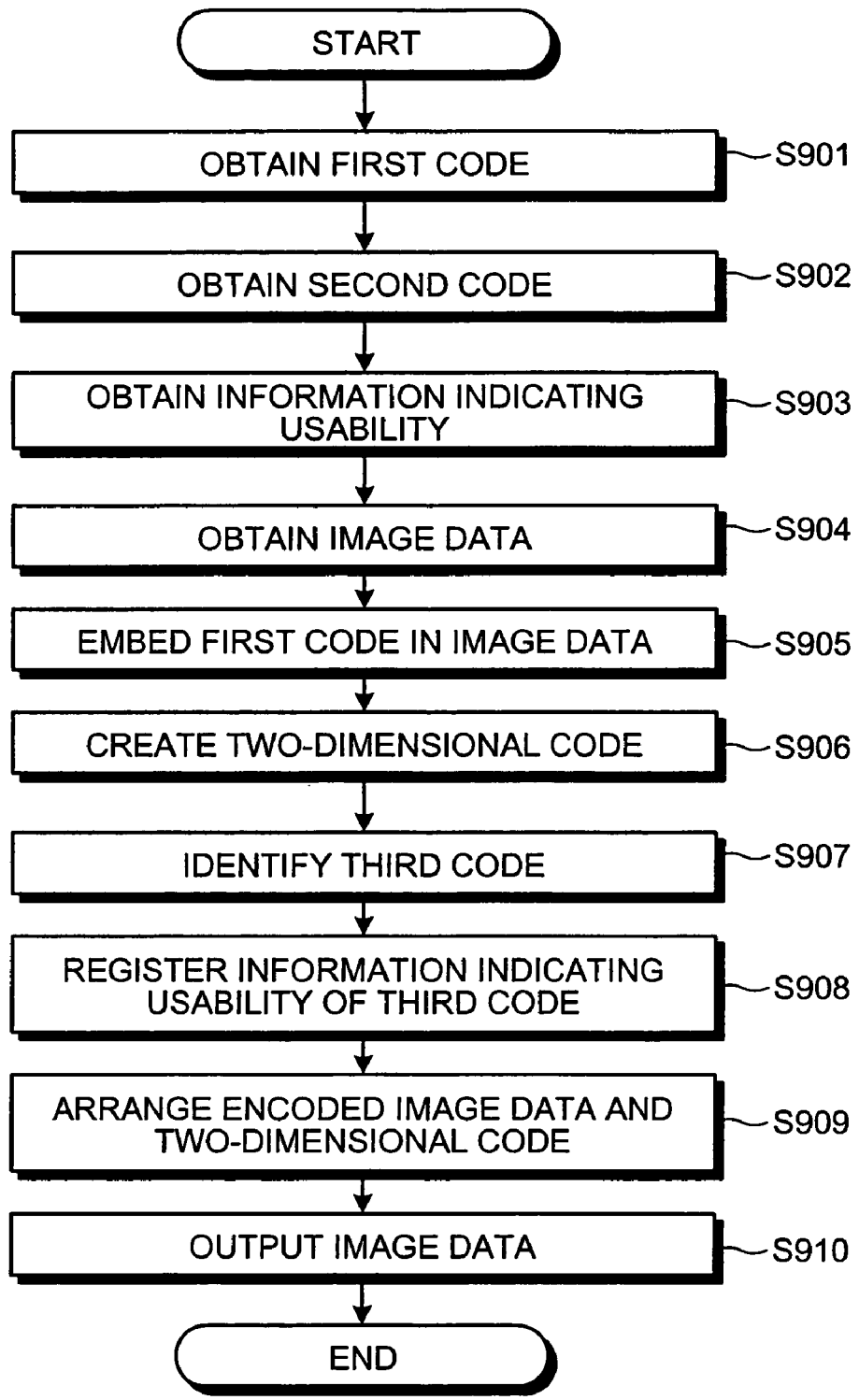
FIG. 29 is a flowchart of a process performed by the code embedding device according to the fifth embodiment.

A process performed by the code embedding device 900 according to the fifth embodiment will be explained next. FIG. 29 is a flowchart of a process performed by the code embedding device 900 according to the fifth embodiment. In the code embedding device 900 shown in FIG. 29, the code embedding unit 910 obtains a first code from the input device 20 (step S901), the two-dimensional code creating unit 920 obtains a second code from the input device 20 (step S902), and the use information managing unit 940 obtains information indicating usability from the input device 20 (step S903).

The code embedding unit 910 obtains image data from the image input device 30 (step S904), embeds the first code in the image data, sends encoded image data to the code arranging unit 930, and sends the first code to the use information managing unit 940 (step S905). The two-dimensional code creating unit 920 creates a two-dimensional code by encoding the second code, sends the two-dimensional code to the code arranging unit 930, and sends the second code to the use information managing unit 940 (step S906).

The use information managing unit 940 then identifies the third code from the first code and the second code (step S907), and registers information indicating the usability of the third code in the code use information 950a (step S908). The code arranging unit 930 arranges the encoded image data and the two-dimensional code (step S909) and outputs the image data to the printing device 40 (step S910).

Thus according to the code embedding device 900 of the fifth embodiment, the code embedding unit 910 embeds the first code in the image data, the two-dimensional code creating unit 920 encodes the second code to a two-dimensional code, and the use information managing unit 940 registers information indicating the usability of the third code. Therefore, the number of valid digits in the code can be increased while preventing the code from being used unrestrictedly.

Figure 30:
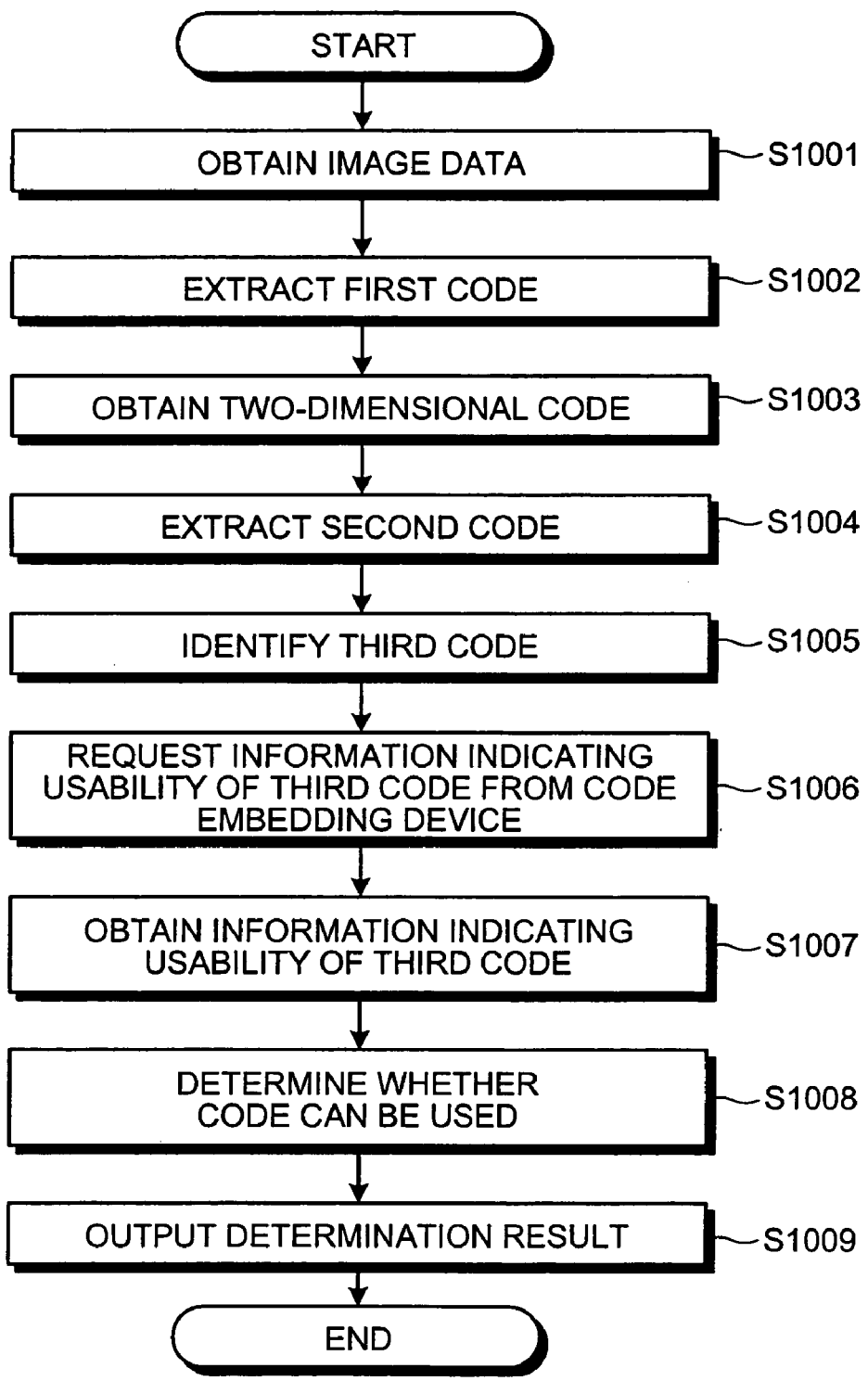
FIG. 30 is a flowchart of a process performed by the code authenticating device according to the fifth embodiment.

A process performed by the code authenticating device 1000 according to the fifth embodiment will be explained next. FIG. 30 is a flowchart of a process performed by the code authenticating device 1000 according to the fifth embodiment. As shown in FIG. 30, the code extraction processor 1010 of the code authenticating device 1000 obtains the image data from the image input device 35 (step S1001), extracts the first code, and sends the extracted first code to the code use information obtaining unit 1030 and the usability determining unit 1040 (step S1002).

The decoder 1020 obtains a two-dimensional code from the image input device 35 (step S1003), extracts the second code from the two-dimensional code, and sends the extracted second code to the code use information obtaining unit 1030 and the usability determining unit 1040 (step S1004).

The code use information obtaining unit 1030 identifies the third code from the first code and the second code (step S1005), requests information indicating the usability of the third code from the code embedding device 900 (step S1006), obtains the information indicating the usability of the third code, and sends the obtained information to the usability determining unit 1040 (step S1007).

The usability determining unit 1040 determines whether the third code can be used (step S1008), and outputs a determination result to the display device 50 (step S1009). When the usability determining unit 1040 determines that the third code cannot be used, it makes the display device 50 display a message "This code cannot be used." When the usability determining unit 1040 determines that the third code can be used, it makes the display device 50 display a message "This code can be used."

Thus the code extraction processor 1010 of the code embedding device 100 extracts the first code, the decoder 1020 extracts the third code, and the usability determining unit 1040 determines whether the third code can be used. It is therefore possible to restrict the use of that third code including the code that is embedded in the image data and a code that is embedded in a two-dimensional code.

As described above, according to the code embedding device 900 of the fifth embodiment, the code embedding unit 910 embeds the first code in the image data, the two-dimensional code creating unit creates a two-dimensional code from the second code, and the use information managing unit 970 registers information that relates to the usability of the third code including the first code and the second code in the code use information 950a. Therefore, the number of valid digits in the code can be easily increased, and use of the code can be restricted efficiently.

Characteristics of a code embedding device according to a sixth embodiment will be explained next. The code embedding device according to the sixth embodiment uses a method similar to that of the first embodiment to embed a code in image data, obtains information that identifies a user of the code (hereinafter, "user ID"), and stores information indicating the usability of the code embedded in the image in correlation with the user ID.

The code authenticating device according to the sixth embodiment extracts the code that is embedded in the printed matter. In addition, it obtains a user ID of a user who uses this code, obtains information indicating whether the user who corresponds to this user ID can use the code from the code embedding device, and makes a determination.

Thus the code embedding device according to the sixth embodiment manages information indicating usability for each user ID, even if the code is the same. Therefore, even when the same code is issued for a plurality of users, use of the code can be restricted for each user.

The code authenticating device according to the sixth embodiment determines whether the code can be used based on the code embedded in the printed matter and the user ID. Therefore, even when a plurality of users attempt to use the code by using the same steganography code, use of the code can be restricted for each individual user.

Figure 31:
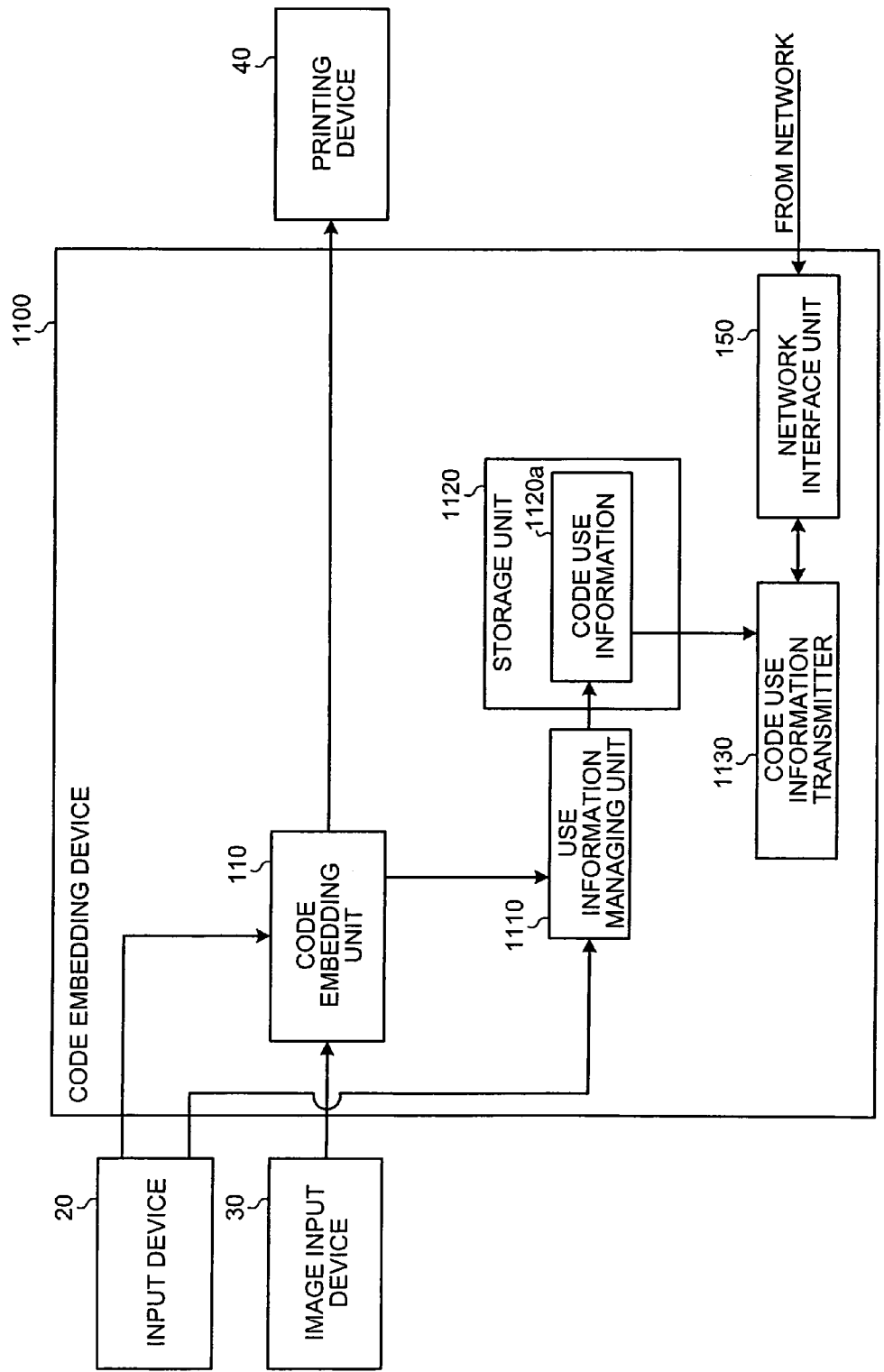
FIG. 31 is a functional block diagram of a code embedding device according to a sixth embodiment.

The configuration of the code embedding device according to the sixth embodiment will be explained next. FIG. 31 is a functional block diagram of the configuration of the code embedding device according to the sixth embodiment. As shown in FIG. 31, a code embedding device 1100 includes a use information managing unit 1110, a storage unit 1120, and a code use information transmitter 1130. Since other configurations and elements are the same as the code embedding device 100 shown in FIG. 2, they are designated with like reference numerals and are not explained again.

The use information managing unit 1110 is a processor that obtains the code that is embedded in the image data from the code embedding unit 110, obtains a user ID that corresponds to this code and information indicating the usability of the code from the input device 20, and creates code use information based on the obtained information. The use information managing unit 1110 stores the created code use information in the storage unit 1120.

The storage unit 1120 stores code use information 1120a. FIG. 32 is one example of the data structure of the code use information 1120a according to the sixth embodiment. As shown in FIG. 32, this code use information 1120a includes "code", "user ID", and "usability". In the example of FIG. 32, there are three user IDs for code "0000", namely "000", "001", and "002", while use of code "0000" is permitted only for user ID "001".

The code use information transmitter 1130 is a processor that, when it obtains a code and a user ID from the code authenticating device, retrieves information indicating the usability corresponding to the obtained code and the user ID from the code use information 1120a, and transmits the retrieved information to the code authenticating device.

For example, when the code use information transmitter 1130 receives code "0000" and user ID "001" from the code authenticating device, it transmits information indicating that the code "0000" can be used by a user who is identified by the user ID "001" to the code authenticating device (because, in FIG. 32, the usability of code "0000" for user ID "001" is "Usable").

Figure 33:
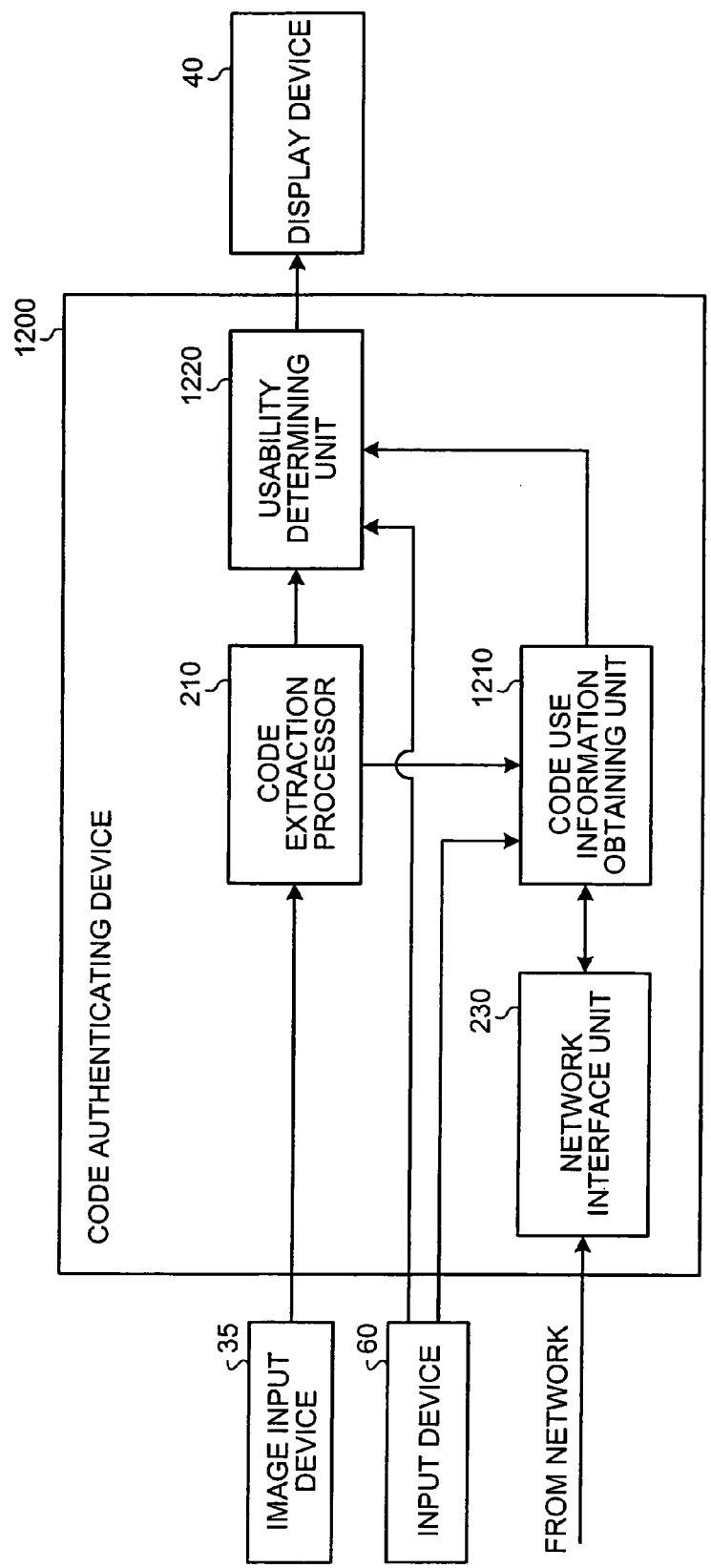
FIG. 33 is a functional block diagram of a code authenticating device according to the sixth embodiment.

The configuration of a code authenticating device according to the sixth embodiment will be explained next. FIG. 33 is a functional block diagram of the configuration of a code authenticating device 1200 according to the sixth embodiment. As shown in FIG. 33, the code authenticating device 1200 includes a code use information obtaining unit 1210 and a usability determining unit 1220. Since other configurations and elements are the same as the code embedding device 200 shown in FIG. 7, they are designated with like reference numerals and are not explained again.

The code use information obtaining unit 1210 is a processor that obtains a code from the code extraction processor 210, obtains a user ID from an input device 60, and requests information indicating the usability of the obtained code and the user ID from the code embedding device 1100. Specifically, when the code use information obtaining unit 1210 obtains the code "0000" and the user ID "001", it requests information indicating the usability of the code "0000" with respect to the user ID "001" from the code embedding device 1100.

When the code use information obtaining unit 1210 receives a reply from the code embedding device 1100 (for example, the code "0000" is "usable" for the user ID "001"), it sends the received information to the usability determining unit 1220.

The usability determining unit 1220 is a processor that obtains the code from the code extraction processor 210, obtains the user ID from the input device 60, obtain information indicating the usability with respect to the code and the user ID from the code use information obtaining unit 1210, and determines whether the code extracted by the code extraction processor 210 can be used by the user who corresponds to the user ID obtained from the input device 60.

For example, when the usability determining unit 1220 obtains code "0000" from the code extraction processor 210, obtains the user ID "001" from the input device 60, and obtains information indicating that "code 0000 and user ID 001 are usable", it determines that the code "0000" and the user ID "001" can be used.

On the other hand, when the usability determining unit 1220 obtains code "0000" from the code extraction processor 210, obtains the user ID "001" from the input device 60, and obtains information indicating that "code 0000 and user ID 001 are unusable", it determines that the code "0000" and the user ID "001" cannot be used.

Figure 34:
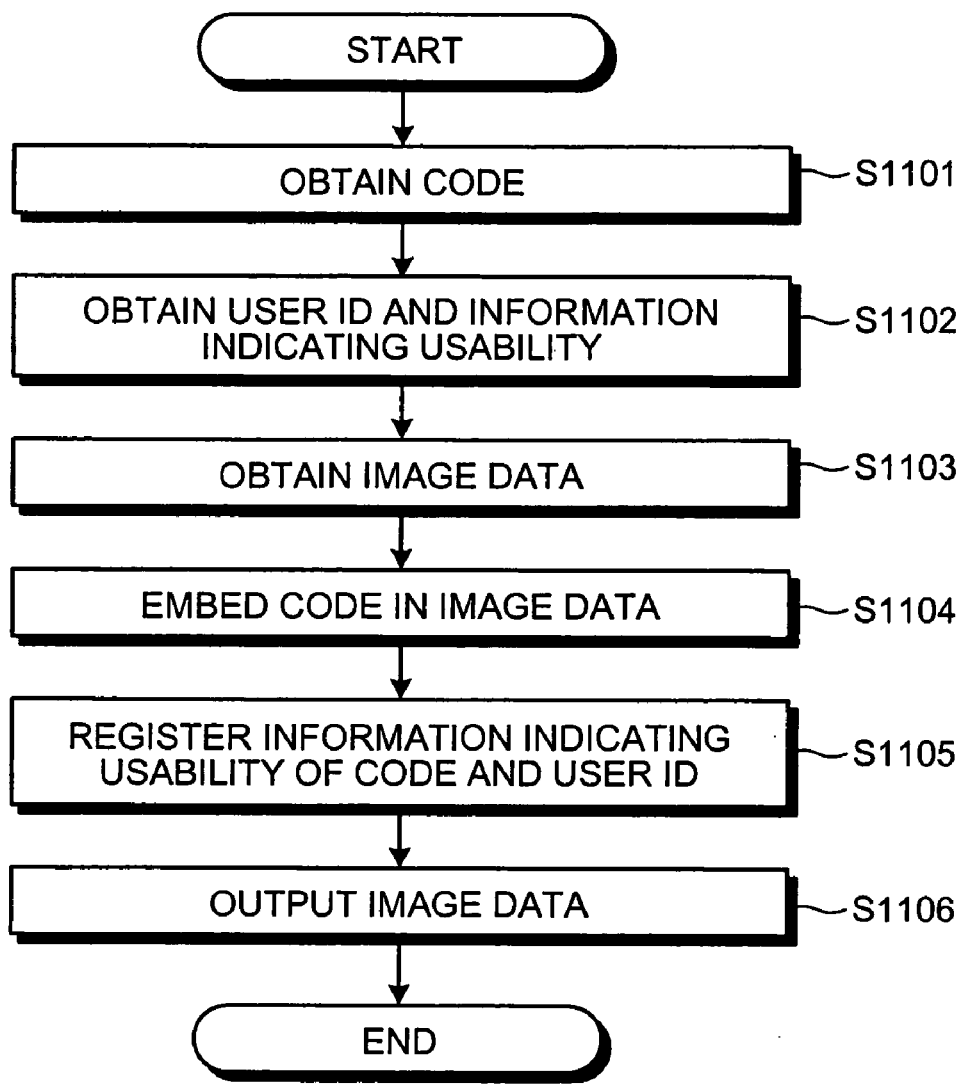
FIG. 34 is a flowchart of a process performed by the code embedding device according to the sixth embodiment.

A process performed by the code embedding device 1100 according to the sixth embodiment will be explained next. FIG. 34 is a flowchart of a process performed by the code embedding device 1100 according to the sixth embodiment. In the code embedding device 1100 shown in FIG. 34, the code embedding unit 110 obtains a code from the input device 20 (step S1101), and the use information managing unit 1110 obtains a user ID and information indicating usability from the input device 20 (step S1102).

The code embedding unit 110 obtains image data from the image input device 30 (step S1103), and embeds a code in the image data (step S1104). The use information managing unit 1110 obtains the code from the code embedding unit 110 and registers information indicating the usability of the code and the user ID in the code use information 1120*a* (step S1105). The code embedding unit 110 outputs encoded image data to the printing device 40 (step S1106).

Since the use information managing unit 1110 of the code embedding device 1100 registers the information indicating the usability of the code and the user ID in the code use information 1120*a* in this way, use of the code can be restricted for each user ID even when a plurality of identical codes are issued.

Figure 35:
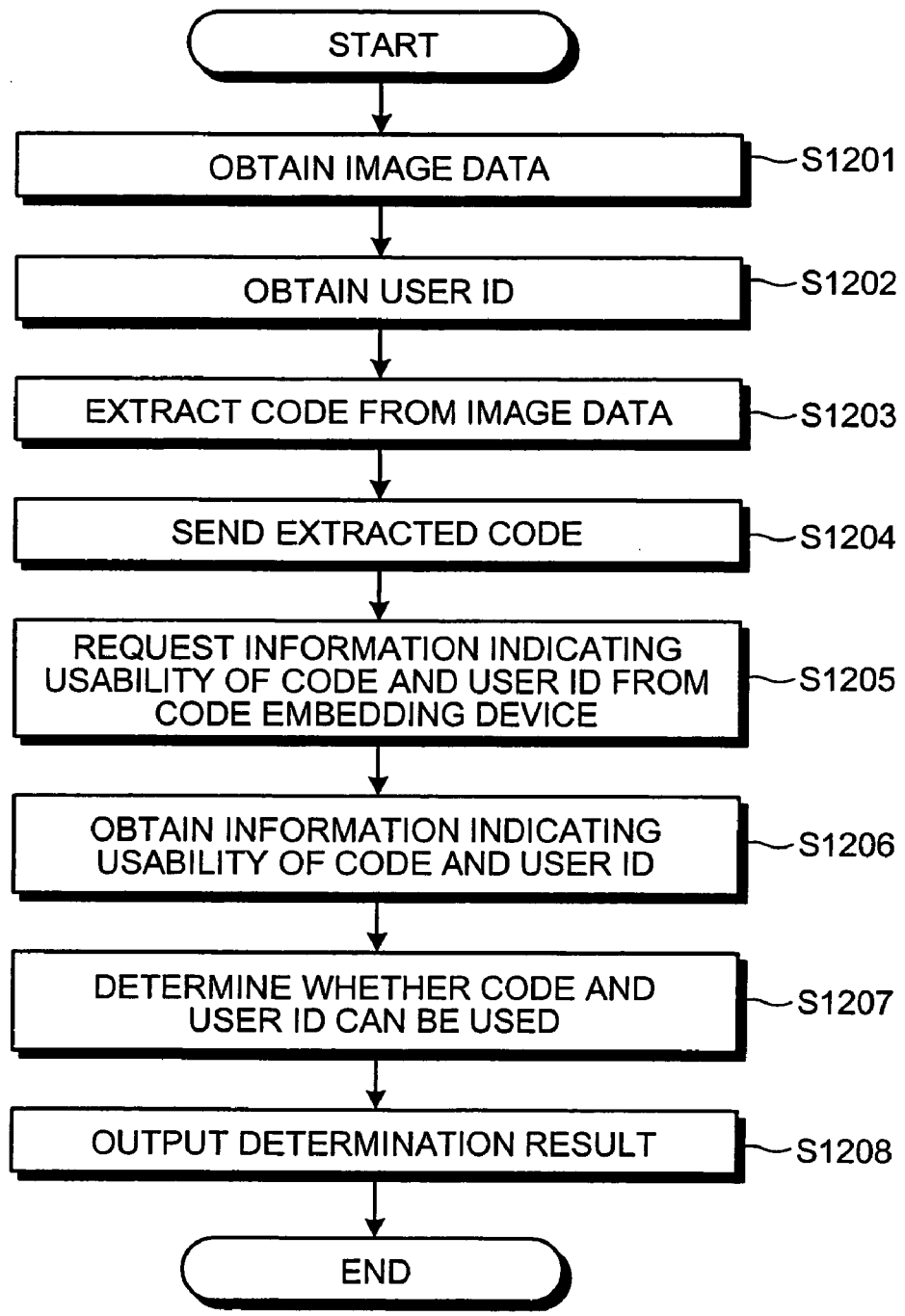
FIG. 35 is a flowchart of a process performed by the code authenticating device according to the sixth embodiment.

A process performed by the code authenticating device 1200 according to the sixth embodiment will be explained next. FIG. 35 is a flowchart of a process performed by the code authenticating device 1200 according to the sixth embodiment. As shown in FIG. 35, the code extraction processor 210 of the code authenticating device 1200 obtains the image data from the image input device 35 (step S1201), and the code use information obtaining unit 1210 obtains a user ID from the input device 60 (step S1202).

The code extraction processor 210 extracts the code from the image data (step S1203), and sends the extracted code to the code use information obtaining unit 1210 and the usability determining unit 1220 (step S1204). The code use information obtaining unit 1210 requests information indicating the usability of the code and the user ID from the code embedding device 1100 (step S1205), obtains the information indicating the usability of the code and the user ID, and sends the obtained information to the usability determining unit 1220 (step S1206).

The usability determining unit 1220 then determines whether the code obtained from the code extraction processor 210 and the user ID obtained from the input device 60 can be used, based on the information obtained from the code use information obtaining unit 1210 (step S1207), and outputs a determination result to the printing device 40 (step S1208).

Thus according to this code authenticating device 1200, since the code extraction processor 210 extracts the code from the image data, and the usability determining unit 1220 determines whether the code and the user ID can be used, use of the code can be restricted for each user ID even when the code is the same.

As described above according to the code embedding device 1100 of the sixth embodiment, the code embedding unit 110 obtains the code and the image data, embeds the code by using the difference in average density of the image data, and creates encoded image data. The use information managing unit 1110 registers information that indicates the usability of the code and the user ID in the code use information 1120*a*, and the code use information transmitter 1130 transmits the corresponding information to the code authenticating device 1200 in reply to a request therefrom. Therefore, even if the same code is issued to users, use of the code by each individual user can be restricted.

In the code authenticating device 1200, the code extraction processor 210 extracts the code from the image data created by the code embedding device 100 by using the difference in average density of the image data. The code use information obtaining unit 1210 requests information that indicates the usability of the code and the user ID from the code embedding device 1100, and obtains this information. Based on the information indicating the usability of the code and the user ID, the usability determining unit 1220 determines whether the code and the user ID can be used and outputs a determination result to the display device 50. Therefore, even when the same code is used, use of the code can be restricted for each user.

While in the sixth embodiment, the code embedding device 1100 stores the information indicating the usability of the code and the user ID as the code use information, it is acceptable to use a telephone number, such as the number of a mobile telephone owner by the user, instead of the user ID.

The code embedding device and the code authenticating device according to the first to the sixth embodiments described above can be applied in a point of sales (POS) system that is used in supermarkets, convenience stores, and the like, or in a server-client system and the like.

An example where the code embedding device and the code authenticating device according to the first to the sixth embodiments are applied in a POS system will be explained next. A manager of a supermarket uses the code embedding device beforehand to create encoded image data and code use information (information that allows use of the code, information that limits use of the code, or the like).

The manager then uses a computer that is connected to a network to transmit the encoded image data to a mobile terminal device of a customer (for example, a mobile telephone), and to transmit the embedded code and the code use information to a management server. The management server stores and manages codes in correlation with code use information. When the manager changes the code use information, he uses the computer to access the management server, and updates the code use information. The manager checks the address of the mobile terminal device of the customer beforehand.

When a member of the supermarket staff accepts payment for a product, he uses a reader on a POS terminal to read the image data from the screen of the customer's mobile telephone. The code authenticating device (the code authenticating device being connected to or incorporated in the POS terminal) extracts the code from the image data read by the POS terminal, and requests code use information corresponding to the extracted code from the management server.

The code authenticating device then obtains the code use information from the management server, determines whether the code that is embedded in the image data can be used, and reports the determination result to the POS terminal. When the code authenticating device determines that "the code can be used", the POS terminal subtracts a predetermined sum from the price of the product. When the code authenticating device determines that "the code cannot be used", the POS terminal does not discount the price of the product.

By applying the code embedding device and the code authenticating device according to the present invention in a POS system or the like, the manager can accelerate sales of products and can restrict the use of codes (coupons), thereby solving the problem of failing to obtain intended profits due to multiple use of codes.

The processes of the code embedding device and the code authenticating device according to the first to the sixth embodiments described above can be realized by making a computer execute programs prepared beforehand. An example of a computer that realizes the functions of the code embedding device and the code authenticating device will be explained next.

FIG. 36 is a functional block diagram of the computer that realizes the functions of the code embedding device and the code authenticating device. As shown in FIG. 36, a computer 1300 includes an input/output interface device 1310, a network interface device 1320, a RAM 1330, an HDD 1340, a ROM 1350, and a CPU 1360, these being connected to a bus 1370.

The input/output interface device 1310 connects an input device such as a mouse and a keyboard to an output device such as a display device and a printer. The network interface device 1320 communicates with other computers on the network by using predetermined communication protocols.

The RAM 1330 is a memory that stores programs, execution midway results of programs and the like. In the example of FIG. 36, the RAM 1330 records code data 1330a, image data 1330b, and code use information 1330c. The code data 1330a is information indicating the code embedded in the image data, and the image data is the image data that the code is embedded in. The code use information 1330c corresponds to the code use information 130a shown in FIG. 2.

The HDD 1340 is a disk device that stores programs and data. In the example of FIG. 36, the HDD 1340 stores code use information 1340a. This code use information 1340a is read in the RAM 1330 by the CPU 1360.

When the computer 1300 functions as a code embedding device, an encoding program that performs functions similar to those of the code embedding devices according to the first to the sixth embodiments described above, that is, in FIG. 36, an encoding program 1350a, is recorded beforehand in the ROM 1350.

The CPU 1360 reads the encoding program 1350a from the ROM 1350 and executes it, whereby, as shown in FIG. 36, the encoding program 1350a functions as an encoding process 1360a. The CPU 1360 embeds the code in the image data, and registers information indicating the usability of the embedded code in the code use information 1330c.

On the other hand, when the computer functions as a code authenticating device, a decoding program that performs functions similar to those of the code authenticating device according to the first to the sixth embodiments described above, that is, in FIG. 36, a decoding program 1350b, is recorded beforehand in the ROM 1350.

The CPU 1360 reads the decoding program 1350b from the ROM 1350 and executes it, whereby, as shown in FIG. 36, the decoding program 1350b functions as a decoding process 1360b. The CPU 1360 extracts the code from the image data, and determines whether the extracted code can be used based on the code use information 1330c.

While in the first to the sixth embodiments, the code embedding device and the code authenticating device are connected via a network, the configuration is not limited to this. For example, the code embedding device and the code authenticating device can be arranged as a single device.

Although not described in the code embedding devices according to the second to the sixth embodiments, similar to the code embedding device 300 shown in FIG. 10, the use information update unit 310 can be provided, enabling the manager of the code embedding device to update the code use information 1330c whenever necessary.

According to the present invention, the encoding device divides the image into a plurality of blocks, embeds data in the image based on the difference in characteristic quantities of adjacent blocks, and records use restriction information that restricts the use of the data embedded in the image. Therefore, this encoding device can prevent illegitimate falsification/use of the data that is embedded in the image.

According to the present invention, the encoding device divides the image into a plurality of blocks, embeds data in the image based on the difference in characteristic quantities of adjacent blocks, and records information that indicates whether use of the data embedded in the image is permitted as use restriction information. Therefore, it is possible to efficiently manage and restrict the usability of the data (code) embedded in the image.

According to the present invention, when the data embedded in the image has been used, the encoding device randomly changes the information that indicates whether use of the data is permitted. Therefore, even if a plurality of identical data (codes) are issued, the use frequencies of the issued codes can be restricted.

According to the present invention, the decoding device divides the image into a plurality of blocks, extracts the data embedded in the image based on the difference in characteristic quantities of adjacent blocks, obtains the use restriction information that restricts the use of the extracted data, and determines, based on the obtained use restriction information, whether use of the data embedded in the image is permitted. Therefore, the decoding device can prevent unrestricted use of the data that is embedded in the image.

According to the present invention, a printed matter is made by printing an image created by the encoding device that divides the image into a plurality of blocks, embeds data in the image based on the difference in characteristic quantities of adjacent blocks, and records use restriction information that restricts the use of the data embedded in the image. Therefore, unrestricted use of the data that is embedded in the printed matter can be prevented.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An encoding device that creates an image in which data is embedded, comprising:
   an embedding unit that divides an image into a plurality of blocks, and embeds data in the image based on a difference in value of characteristics of adjacent blocks; and
   a restriction information recording unit that records use restriction information that restricts use of the data embedded by the embedding unit, further comprising:
   a usability determining unit that randomly determines usability of the embedded data; and
   an updating unit that updates the use restriction information based on randomly determined usability.

2. The encoding device according to claim 1, wherein the use restriction information indicates whether use of the embedded data is permitted.

3. The encoding device according to claim 2, further comprising:
   a usability changing unit that, when the embedded data has been used, randomly changes the use restriction information indicating whether use of the embedded data is permitted.

4. The encoding device according to claim 1, wherein the use restriction information indicates a valid time-limit until which use of the embedded data is permitted.

5. The encoding device according to claim 1, wherein the use restriction information indicates a number of valid uses of the embedded data.

6. The encoding device according to claim 5, further comprising:
   a use updating unit that updates the use restriction information by subtracting 1 from the number of valid uses, for each use of the embedded data.

7. The encoding device according to claim 1, further comprising:
   an encoding unit that encodes second data, which is different from the embedded data, as a combination of graphic patterns, and wherein the use restriction information restricts the use of the embedded data and the second data.

8. The encoding device according to claim 1, further comprising:
   an identification information obtaining unit that obtains information for identifying a user of the embedded data, and wherein the use restriction information restricts the use of the embedded data for the user identified by the identification information.

9. The encoding device according to claim 1, further comprising:
   a changing unit that changes the use restriction information recorded.

10. The encoding device according to claim 1, wherein the characteristics are any one of average density, granularity, saturation, density mass, and dispersion.

11. The encoding device according to claim 1, further comprising:
    a use restriction information storing unit that stores the use restriction information, wherein
    the restriction information recording unit records the use restriction information in the use restriction information storing unit.

12. The encoding device according to claim 11, further comprising:
    a restriction information transmitting unit that transmits, if requested, the use restriction information stored in the use restriction information storing unit.

13. A decoding device that extracts data embedded in an image, comprising:
    a data extracting unit that divides an image into a plurality of blocks, and extracts the data embedded in the image based on a difference in value of characteristics of adjacent blocks;
    an acquiring unit that acquires use restriction information that restricts use of the data extracted by the data extracting unit; and
    a determining unit that determines, based on the use restriction information acquired, whether use of the extracted data is permitted, further comprising:
    a usability determining unit that randomly determines usability of the embedded data; and
    an updating unit that updates the use restriction information based on randomly determined usability.

14. A printed matter including an image that is printed after being created by an encoding device, wherein the encoding device includes
    an embedding unit that divides an image into a plurality of blocks, and embeds data in the image based on a difference in value of characteristics of adjacent blocks; and
    a restriction information recording unit that records use restriction information that restricts use of the data embedded by the embedding unit, further comprising:
    a usability determining unit that randomly determines usability of the embedded data; and
    an updating unit that updates the use restriction information based on randomly determined usability.

* * * * *